United States Patent
Zhu et al.

(10) Patent No.: US 9,979,960 B2
(45) Date of Patent: May 22, 2018

(54) FRAME PACKING AND UNPACKING BETWEEN FRAMES OF CHROMA SAMPLING FORMATS WITH DIFFERENT CHROMA RESOLUTIONS

(71) Applicant: Microsoft Corporation, Redmond, WA (US)

(72) Inventors: Lihua Zhu, Mountain View, CA (US); Sridhar Sankuratri, Campbell, CA (US); B. Anil Kumar, Saratoga, CA (US); Yongjun Wu, Bellevue, WA (US); Sandeep Kanumuri, Redmond, WA (US); Shyam Sadhwani, Bellevue, WA (US); Gary J. Sullivan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 373 days.

(21) Appl. No.: 14/027,013

(22) Filed: Sep. 13, 2013

(65) Prior Publication Data

US 2014/0092998 A1 Apr. 3, 2014

Related U.S. Application Data

(60) Provisional application No. 61/708,328, filed on Oct. 1, 2012.

(51) Int. Cl.
*H04N 19/186* (2014.01)
*H04N 19/30* (2014.01)
(Continued)

(52) U.S. Cl.
CPC ....... *H04N 19/00436* (2013.01); *H04N 1/646* (2013.01); *H04N 9/64* (2013.01);
(Continued)

(58) Field of Classification Search
CPC .. H04N 19/00436; H04N 19/63; H04N 19/70; H04N 19/503; H04N 19/436;
(Continued)

(56) References Cited

U.S. PATENT DOCUMENTS

| 5,047,853 A * | 9/1991 | Hoffert | G06T 9/005 |
| | | | 375/240.01 |
| 5,412,428 A * | 5/1995 | Tahara | H04N 7/54 |
| | | | 375/240.25 |

(Continued)

FOREIGN PATENT DOCUMENTS

| CN | 1627830 | 6/2005 |
| CN | 102801988 | 11/2012 |

(Continued)

OTHER PUBLICATIONS

International Search Report and Written Opinion dated Dec. 2, 2013, from International Patent Application No. PCT/US2013/061784, 15 pp.

(Continued)

*Primary Examiner* — Jay Patel
*Assistant Examiner* — Marnie Matt
(74) *Attorney, Agent, or Firm* — Klarquist Sparkman, LLP

(57) ABSTRACT

Video frames of a higher-resolution chroma sampling format such as YUV 4:4:4 are packed into video frames of a lower-resolution chroma sampling format such as YUV 4:2:0 for purposes of video encoding. For example, sample values for a frame in YUV 4:4:4 format are packed into two frames in YUV 4:2:0 format. After decoding, the video frames of the lower-resolution chroma sampling format can be unpacked to reconstruct the video frames of the higher-resolution chroma sampling format. In this way, available encoders and decoders operating at the lower-resolution (Continued)

chroma sampling format can be used, while still retaining higher resolution chroma information. In example implementations, frames in YUV 4:4:4 format are packed into frames in YUV 4:2:0 format such that geometric correspondence is maintained between Y, U and V components for the frames in YUV 4:2:0 format.

29 Claims, 11 Drawing Sheets

(51) Int. Cl.
    *H04N 19/59*     (2014.01)
    *H04N 19/70*     (2014.01)
    *H04N 19/80*     (2014.01)
    *H04N 19/88*     (2014.01)
    *H04N 1/64*     (2006.01)
    *H04N 9/64*     (2006.01)
    *H04N 21/2343*     (2011.01)
    *H04N 19/33*     (2014.01)

(52) U.S. Cl.
    CPC ........... *H04N 19/186* (2014.11); *H04N 19/30* (2014.11); *H04N 19/59* (2014.11); *H04N 19/70* (2014.11); *H04N 19/80* (2014.11); *H04N 19/88* (2014.11); *H04N 21/234327* (2013.01); *H04N 21/234363* (2013.01)

(58) Field of Classification Search
    CPC ...... H04N 19/186; H04N 19/30; H04N 19/59; H04N 19/80; H04N 19/88; H04N 1/646; H04N 9/64; H04N 21/234327; H04N 21/234363
    USPC ........................................ 375/240.08, 240.29
    See application file for complete search history.

(56) References Cited

U.S. PATENT DOCUMENTS

| | | | |
|---|---|---|---|
| 5,650,824 A * | 7/1997 | Huang | H04N 7/012 348/450 |
| 5,712,687 A * | 1/1998 | Naveen | H04N 9/64 348/441 |
| 5,742,892 A * | 4/1998 | Chaddha | G06T 9/008 375/240.11 |
| 6,208,350 B1 | 3/2001 | Herrera | |
| 6,674,479 B2 * | 1/2004 | Cook | H04N 9/641 345/600 |
| 6,700,588 B1 | 3/2004 | MacInnis et al. | |
| 6,937,659 B1 * | 8/2005 | Nguyen | H04N 19/503 348/397.1 |
| 6,938,105 B2 | 8/2005 | Osa | |
| 7,551,792 B2 | 6/2009 | Kong et al. | |
| 7,924,292 B2 | 4/2011 | Bujold et al. | |
| 7,995,069 B2 | 8/2011 | Van Hook et al. | |
| 8,054,886 B2 | 11/2011 | Srinivasan et al. | |
| 8,139,081 B1 * | 3/2012 | Daniel | H04N 19/40 345/546 |
| 8,472,731 B2 | 6/2013 | Suzuki et al. | |
| 8,532,175 B2 | 9/2013 | Pandit et al. | |
| 8,532,424 B2 | 9/2013 | Zarubinsky et al. | |
| 8,625,666 B2 | 1/2014 | Bakke | |
| 8,639,057 B1 | 1/2014 | Mendhekar et al. | |
| 8,737,466 B2 | 5/2014 | Demos | |
| 8,780,996 B2 | 7/2014 | Bankoski et al. | |
| 8,787,443 B2 | 7/2014 | Sun et al. | |
| 8,787,454 B1 | 7/2014 | Chechik et al. | |
| 8,817,179 B2 | 8/2014 | Zhu et al. | |
| 8,837,826 B1 | 9/2014 | Gaddy | |
| 8,953,673 B2 | 2/2015 | Tu et al. | |
| 9,153,017 B1 | 10/2015 | Russell et al. | |
| 9,185,421 B2 | 11/2015 | Wang et al. | |
| 9,288,500 B2 | 3/2016 | Budagavi | |
| 2002/0101536 A1 * | 8/2002 | Cook | H04N 9/641 348/453 |
| 2003/0108248 A1 | 6/2003 | Huang et al. | |
| 2005/0024384 A1 * | 2/2005 | Evans | G09G 5/363 345/604 |
| 2005/0053294 A1 * | 3/2005 | Mukerjee | H04N 19/52 382/236 |
| 2005/0228654 A1 | 10/2005 | Prieto et al. | |
| 2006/0013490 A1 | 1/2006 | Sun | |
| 2007/0074266 A1 | 3/2007 | Raveendran et al. | |
| 2007/0110153 A1 | 5/2007 | Cho et al. | |
| 2008/0043852 A1 | 2/2008 | Park et al. | |
| 2008/0069247 A1 | 3/2008 | He | |
| 2009/0003435 A1 | 1/2009 | Cho et al. | |
| 2009/0219994 A1 * | 9/2009 | Tu | H04N 19/186 375/240.08 |
| 2009/0225225 A1 | 9/2009 | Nakagawa et al. | |
| 2010/0046612 A1 | 2/2010 | Sun et al. | |
| 2010/0046635 A1 | 2/2010 | Pandit et al. | |
| 2011/0199542 A1 | 8/2011 | Hirai | |
| 2011/0280316 A1 * | 11/2011 | Chen | H04N 13/0048 375/240.25 |
| 2011/0286530 A1 * | 11/2011 | Tian | H04N 21/2365 375/240.25 |
| 2012/0008679 A1 * | 1/2012 | Bakke | H04N 19/186 375/240.08 |
| 2012/0020413 A1 * | 1/2012 | Chen | H04N 19/597 375/240.26 |
| 2012/0093226 A1 * | 4/2012 | Chien | H04N 19/139 375/240.16 |
| 2012/0236115 A1 | 9/2012 | Zhang et al. | |
| 2012/0307904 A1 | 12/2012 | Yi et al. | |
| 2013/0003840 A1 | 1/2013 | Gao et al. | |
| 2013/0106998 A1 * | 5/2013 | Pahalawatta | H04N 13/0029 348/43 |
| 2013/0113884 A1 | 5/2013 | Leonatris | |
| 2013/0121415 A1 | 5/2013 | Wahadaniah et al. | |
| 2013/0188744 A1 | 7/2013 | Van de Auwera | |
| 2013/0202201 A1 | 8/2013 | Park et al. | |
| 2013/0243076 A1 | 9/2013 | Malladi | |
| 2013/0287097 A1 | 10/2013 | Song et al. | |
| 2014/0022460 A1 | 1/2014 | Li et al. | |
| 2014/0064379 A1 | 3/2014 | Mrak et al. | |
| 2014/0072027 A1 | 3/2014 | Li et al. | |
| 2014/0072048 A1 | 3/2014 | Ma et al. | |
| 2014/0112394 A1 | 4/2014 | Sullivan et al. | |
| 2014/0169447 A1 | 6/2014 | Hellman | |
| 2014/0192261 A1 | 7/2014 | Zhu | |
| 2014/0247890 A1 | 9/2014 | Yamaguchi | |
| 2014/0301464 A1 | 10/2014 | Wu | |
| 2014/0341305 A1 | 11/2014 | Qu et al. | |
| 2015/0010068 A1 | 1/2015 | Francois et al. | |
| 2015/0016501 A1 | 1/2015 | Guo et al. | |
| 2016/0212373 A1 | 7/2016 | Aharon et al. | |
| 2016/0212433 A1 | 7/2016 | Aharon et al. | |
| 2016/0277762 A1 | 9/2016 | Zhang et al. | |

FOREIGN PATENT DOCUMENTS

| | | |
|---|---|---|
| EP | 0788282 | 8/1997 |
| EP | 1542476 | 6/2005 |
| EP | 2456204 | 5/2012 |
| EP | 2904769 | 8/2015 |
| JP | 2001-197499 | 7/2001 |
| JP | 2004-120134 | 4/2004 |
| JP | 2005-176383 | 6/2005 |
| JP | 2010-110007 | 5/2010 |
| JP | 2010-531609 | 9/2010 |
| WO | WO 99/37097 | 7/1999 |
| WO | WO 2008/143156 | 11/2008 |
| WO | WO 2009/002061 | 12/2008 |
| WO | WO 2013/128010 | 9/2013 |

(56) References Cited

OTHER PUBLICATIONS

ISO/IEC, "Information Technology—Coding of Audio-Visual Objects—Part 10: Advanced Video Coding," ISO/IEC 14496-10, 7th edition, 720 pp. (May 2012).
Jin et al., "Resynchronization and Remultiplexing for Transcoding to H.264/AVC," *Journal of Zhejiang University Science A*, pp. 76-81 (Jan. 2006).
Ma et al., "De-Ringing Filter for Scalable Video Coding," *IEEE Int'l Conf. on Multimedia and Expo Workshops*, 4 pp. (Jul. 2013).
Rao et al., *Techniques and Standards for Image, Video, and Audio Coding*, Prentice-Hall, Ch. 2, pp. 9-16 (1996).
Reddy et al., "Subband Decomposition for High-Resolution Color in HEVC and AVC 4:2:0 Video Coding Systems," Microsoft Research Tech Report MSR-TR-2014-31, 12 pp. (Mar. 2014).
Rossholm et al., "Adaptive De-Blocking De-Ringing Post Filter," *IEEE Int'l Conf. on Image Process*, vol. 2, 4 pp. (Sep. 2005).
Schwarz et al., "Overview of the Scalable Video Coding Extension of the H.264/AVC Standard," *IEEE Trans. on Circuits and Systems for Video Technology*, vol. 17, No. 9, pp. 1103-1120 (Sep. 2007).
Wan et al., "Perceptually Adaptive Joint Deringing-Deblocking Filtering for Scalable Video Transmission over Wireless Networks," *Proc. of Signal Processing: Image Communication*, vol. 22, Issue 3, 25 pp. (Mar. 2007).
Wong, "Enhancement and Artifact Removal for Transform Coded Document Images," powerpoint slides, 45 pp. (Apr. 2010).
Ying et al., "4:2:0 Chroma Sample Format for Phase Difference Eliminating and Color Space Scalability," JVT-O078, 13 pp. (Apr. 2005.).
Ali et al., "Survey of Dirac: A Wavelet Based Video Codec for Multiparty Video Conference and Broadcasting," *Intelligent Video Event Analysis & Understanding*, pp. 211-247 (Jan. 2011).
Bross et al., "High Efficiency Video Coding (HEVC) Text Specification Draft 7," JCTVC-I1003_d5, 294 pp. (Apr. 2012).
Bross et al., "High Efficiency Video Coding (HEVC) Text Specification Draft 9," JCTVC-K1003, 311 pp. (Oct. 2012).
Bross et al., "High Efficiency Video Coding (HEVC) Text Specification Draft 10 (for FDIS & Last Call)," JCTVC-L1003, 310 pp. (Jan. 2013).
Bross et al., "Proposed Editorial Improvements for High Efficiency Video Coding (HEVC) Text Specification Draft 8," JCTVC-K0030, 276 pp. (Oct. 2012).
Calderbank et al., "Wavelet Transforms That Map Integers to Integers," *Applied and Computational Harmonic Analysis*, vol. 5, pp. 332-369 (1998).
Chen et al., "R-D Cost Based Effectiveness Analysis of Dual-coder Mixed Chroma-sampling-rate (DMC) Coding for 4:4:4 Screen Content," JCTVC-J0353, 6 pp. (Jul. 2012).
Cohen et al., "Biorthogonal Bases of Compactly Supported Wavelets," Communications on Pure and Applied Mathematics, pp. 485-560 (1992).
Flynn et al., "High Efficiency Video Coding (HEVC) Range Extensions Text Specification: Draft 3," JCTVC-M1005, 315 pp. (Apr. 2013).
Gold, "Stop Worrying About Compression With an on-Camera Video Recorder," downloaded from http://www.bhphotovideo.com/indepth/video/hands-reviews/stop-worrying-about-compression-camera-video-recorder, 6 pp. (Jul. 2012).
He et al., "De-Interlacing and YUV 4:2:2 to 4:2:0 Conversion on TMS320DM6446 Using the Resizer," Texas Instruments Application Report SPRAAK3B, 18 pp. (Dec. 2008).
"HEVC Software Repository," downloaded from https://hevc.hhi.fraunhofer.de/svn/svn_HEVCSoftware/, 1 p. (downloaded on Sep. 17, 2013).
ISO/IEC, "Information Technology—JPEG 2000 Image Coding System—Part 11: Wireless," ISO/IEC FCD 15444-11, 72 pp. (Mar. 2005).
ISO/IEC, "ISO/IEC 11172-2, Information Technology—Coding of Moving Pictures and Associated Audio for Digital Storage Media at up to About 1.5 Mbit/s," 122 pp. (Aug. 1993).
ISO/IEC, "Information Technology—Coding of Audio-Visual Objects: Visual, ISO/IEC 14496-2, Committee Draft," 330 pp. (Mar. 1998).
ITU-R, Recommendation ITU-R BT.601-7, "Studio Encoding Parameters of Digital Television for Standard 4:3 and Wide-screen 16:9 Aspect Ratios," 19 pp. (Mar. 2011).
ITU-R, Recommendation ITU-R BT.709-5, "Parameter Values for the HDTV Standards for Production and International Programme Exchange," 32 pp. (Apr. 2002).
ITU-R, Recommendation ITU-R BT.2020, "Parameter Values for Ultra-high Definition Television Systems for Production and International Programme Exchange," 7 pp. (Aug. 2012).
ITU-T, "ITU-T Recommendation H.261, Video Codec for Audio-visual Services at p×64 kbits," 28 pp. (Mar. 1993).
ITU-T, "ITU-T Recommendation H.262, Information Technology—Generic Coding of Moving Pictures and Associated Audio Information: Video," 218 pp. (Jul. 1995).
ITU-T, "ITU-T Recommendation H.263, Video Coding for Low Bit Rate Communication," 167 pp. (Feb. 1998).
ITU-T, H.264, "Advanced Video Coding for Generic Audiovisual Services," 680 pp. (Jan. 2012).
ITU-T, T.800, "Information Technology—JPEG 2000 Image Coding System: Core Coding System," 217 pp. (Aug. 2002).
Le Gall et al., "Sub-band Coding of Digital Images Using Symmetric Short Kernel Filters and Arithmetic Coding Techniques," *IEEE Trans. on Acoustics, Speech, and Signal Processing* pp. 761-764 (Apr. 1988).
Lin et al., "Syntax and Semantics of Dual-coder Mixed Chroma-sampling-rate (DMC) Coding for 4:4:4 Screen Content," JCTVC-J0233, 4 pp. (Jul. 2012).
Microsoft Corporation, "ClearType Information," downloaded from http://www.microsoft.com/typography/cleartypeinfo.mspx, 2 pp. (Jan. 2010).
Microsoft Corporation, "Microsoft RemoteFX," downloaded from http://technet.microsoft.com/en-us/library/ff817578(WS.10).aspx, 10 pp. (Feb. 2011).
Mohanbabu et al., "Chroma Subsampling Based Compression of Bayer-Pattern Video Sequences using Gradient Based Interpolation," *European Journal of Scientific Research*, vol. 86, No. 4, pp. 556-564 (Sep. 2012).
Rothweiler, "Polyphase Quadrature Filters—A New Subband Coding Technique," *IEEE Trans. on Acoustics, Speech, and Signal Processing*, pp. 1280-1283 (Apr. 1983).
Smith et al., "Exact Reconstruction Techniques for Tree-Structured Subband Coders," *IEEE Trans. on Acoustics, Speech, and Signal Processing*, vol. ASSP-34, No. 3, pp. 434-441 (Jun. 1986).
SMPTE 421M, "VC-1 Compressed Video Bitstream Format and Decoding Process," 493 pp. (Feb. 2006).
Sullivan et al., "Recommended 8-Bit YUV Formats for Video Rendering (Windows)," downloaded from http://msdn.microsoft.com/en-us/library/windows/desktop/dd206750%28v=vs.85%29.aspx, 14 pp. (Nov. 2008).
Sullivan et al., "Overview of the High Efficiency Video Coding (HEVC) Standard," *IEEE Trans. on Circuits and Systems for Video Technology*, vol. 22, No. 12, pp. 1649-1668 (Dec. 2012).
Sweldens, "The Lifting Scheme: A Construction of Second Generation Wavelets," to appear in *SIAM Journal on Mathematical Analysis*, 42 pp. (May 1995).
Uytterhoeven et al., "Wavelet Based Interactive Video Communication and Image Database Consulting—Wavelet Transforms Using the Lifting Scheme," 24 pp. (Apr. 1997).
Vetro, "Frame Compatible Formats for 3D Video Distribution," Mitsubishi Electric Research Laboratories TR2010-099, 6 pp. (Nov. 2010).
Villasenor et al., "Wavelet Filter Evaluation for Image Compression," *IEEE Trans. on Image Processing*, vol. 4, No. 8, pp. 1053-1060 (Aug. 1995).
Wiegand et al., "Overview of the H.264/AVC Video Coding Standard," *IEEE Trans. on Circuits and Systems for Video Technology*, vol. 13, No. 7, pp. 560-576 (Jul. 2003).
Wikipedia, "Chroma Subsampling," 8 pp. (last modified Aug. 20, 2013).

(56) References Cited

OTHER PUBLICATIONS

Wu et al., "Frame Packing Arrangement SEI for 4:4:4 Content in 4:2:0 Bitstreams," JCTVC-K0240, 6 pp. (Oct. 2012).

Wu et al., "Tunneling High-Resolution Color Content through 4:2:0 HEVC and AVC Video Coding Systems," *IEEE Data Compression Conf.*, 10 pp. (Mar. 2013).

Zhang et al., "Additional Experiment Results for Frame Packing Arrangement SEI Message for 4:4:4 Content in 4:2:0 Bitstreams," JCTVC-M0281, 11 pp. (Apr. 2013).

Zhang et al., "BD-rate Performance vs. Dictionary Size and Hash-table Memory Size in Dual-coder Mixed Chroma-sampling-rate (DMC) Coding for 4:4:4 Screen Content," JCTVC-J0352, 3 pp. (Jul. 2012).

Zhang et al., "Updated Proposal for Frame Packing Arrangement SEI for 4:4:4 Content in 4:2:0 Bitstreams," JCTVC-L0316, 10 pp. (Jan. 2013).

Zhang et al., "Updated Proposal with Software for Frame Packing Arrangement SEI Message for 4:4:4 Content in 4:2:0 Bitstreams," JCTVC-N0270, 9 pp. (Aug. 2013).

Communication Pursuant to Rules 161(1) and 162 EPC dated May 11, 2015, from European Patent Application No. 13774029.6, 2 pp.

Lin et al., "Mixed Chroma Sampling-Rate High Efficiency Video Coding for Full-Chroma Screen Content," IEEE Trans. on Circuits and Systems for Video Technology, vol. 23, No. 1, pp. 173-185 (Jan. 2013).

Su et al., "Image Interpolation by Pixel Level Data-Dependent Triangulation," Computer Graphics Fourm, 13 pp. (Jun. 2004).

Wiegand, "Study of Final Committee Draft of Joint Video Specification (ITU-T Rec. H.264 | ISO/IEC 14496-10 AVC" JVT-F100, 242 pp. (Dec. 2002).

Dumic et al., "Image Quality of 4:2:2 and 4:2:0 Chroma Subsampling Formats," *Int'l Symp. ELMAR*, pp. 19-24 (Sep. 2009).

First Office Action dated Jun. 19, 2017, from Chinese Patent Application No. 201380051471.9, 17 pp.

Khairat et al., "Adaptive Cross-Component Prediction for 4:4:4 High Efficiency Video Coding," *Int'l Conf. on Image Processing*, pp. 3734-3738 (Oct. 2014).

Lin et al., "Mixed Chroma Sampling-Rate Coding: Combining the Merits of 4:4:4 and 4:2:0 and Increasing the Value of Past 4:2:0 Investment," JCTVC-H0065, 5 pp. (Feb. 2012).

Notification of Reasons for Refusal dated Jun. 20, 2017, from Japanese Patent Application No. 2015-534632, 6 pp.

\* cited by examiner software 180 implementing one or more innovations for frame packing and/or unpacking for higher-resolution chroma sampling formats

FRAME PACKING AND UNPACKING BETWEEN FRAMES OF CHROMA SAMPLING FORMATS WITH DIFFERENT CHROMA RESOLUTIONS

CROSS REFERENCE TO RELATED APPLICATION

This application claims the benefit of U.S. Provisional Patent Application No. 61/708,328, filed Oct. 1, 2012, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards and the MPEG-1 (ISO/IEC 11172-2), MPEG-4 Visual (ISO/IEC 14496-2) and SMPTE 421M standards. More recently, the HEVC standard (ITU-T H.265 or ISO/IEC 23008-2) has been under development. See, e.g., draft version JCTVC-I1003 of the HEVC standard—"High efficiency video coding (HEVC) text specification draft 7," JCTVC-I1003_d5, 9$^{th}$ meeting, Geneva, April 2012. A video codec standard typically defines options for the syntax of an encoded video bitstream, detailing parameters in the bitstream when particular features are used in encoding and decoding. In many cases, a video codec standard also provides details about the decoding operations a decoder should perform to achieve conformant results in decoding. Aside from codec standards, various proprietary codec formats define other options for the syntax of an encoded video bitstream and corresponding decoding operations.

A video source such as a camera, animation output, screen capture module, etc. typically provides video that is converted to a format such as a YUV 4:4:4 chroma sampling format. A YUV format includes a luma (or Y) component with sample values representing approximate brightness values as well as multiple chroma (or U and V) components with sample values representing color difference values. In a YUV 4:4:4 format, chroma information is represented at the same spatial resolution as luma information.

Many commercially available video encoders and decoders support only a YUV 4:2:0 chroma sampling format. A YUV 4:2:0 format is a format that sub-samples chroma information compared to a YUV 4:4:4 format, so that chroma resolution is half that of luma resolution both horizontally and vertically. As a design principle, the decision to use a YUV 4:2:0 format for encoding/decoding is premised on the understanding that, for most use cases such as encoding/decoding of natural camera-captured video content, viewers do not ordinarily notice many visual differences between video encoded/decoded in a YUV 4:2:0 format and video encoded/decoded in a YUV 4:4:4 format. The compression advantages for the YUV 4:2:0 format, which has fewer samples per frame, are therefore compelling. There are some use cases, however, for which video has richer color information and higher color fidelity may be justified. In such use cases, the differences between YUV 4:4:4 and YUV 4:2:0 chroma sampling formats are more easily perceived by viewers. For example, for encoding/decoding of computer screen text content, animated video content with artificial hard-edged boundaries, or certain features of video content more generally (such as scrolling titles and hard-edged graphics, or video with information concentrated in chroma channels), a 4:4:4 format may be preferable to a 4:2:0 format. Although screen capture codecs supporting encoding and decoding in a 4:4:4 format are available, the lack of widespread support for codecs supporting 4:4:4 formats (especially with respect to hardware codec implementations) is a hindrance for these use cases.

SUMMARY

In summary, the detailed description presents innovations in frame packing of video frames of a higher-resolution chroma sampling format into video frames of a lower-resolution chroma sampling format for purposes of encoding. For example, the higher-resolution chroma sampling format is a YUV 4:4:4 format, and the lower-resolution chroma sampling format is a YUV 4:2:0 format. After decoding, the video frames of the lower-resolution chroma sampling format can be unpacked to reconstruct the video frames of the higher-resolution chroma sampling format. In this way, available encoders and decoders operating at the lower-resolution chroma sampling format can be used, while still retaining higher resolution chroma information.

For example, a computing device packs one or more frames of a higher-resolution chroma sampling format into one or more frames of a lower-resolution chroma sampling format. The computing device can then encode the one or more frames of the lower-resolution chroma sampling format.

As another example, a computing device unpacks one or more frames of a lower-resolution chroma sampling format into one or more frames of a higher-resolution chroma sampling format. Before such unpacking, the computing device can decode the one or more frames of the lower-resolution chroma sampling format.

The packing or unpacking can be implemented as part of a method, as part of a computing device adapted to perform the method or as part of a tangible computer-readable media storing computer-executable instructions for causing a computing device to perform the method.

The foregoing and other objects, features, and advantages of the invention will become more apparent from the following detailed description, which proceeds with reference to the accompanying figures.

DETAILED DESCRIPTION

Figure 1:
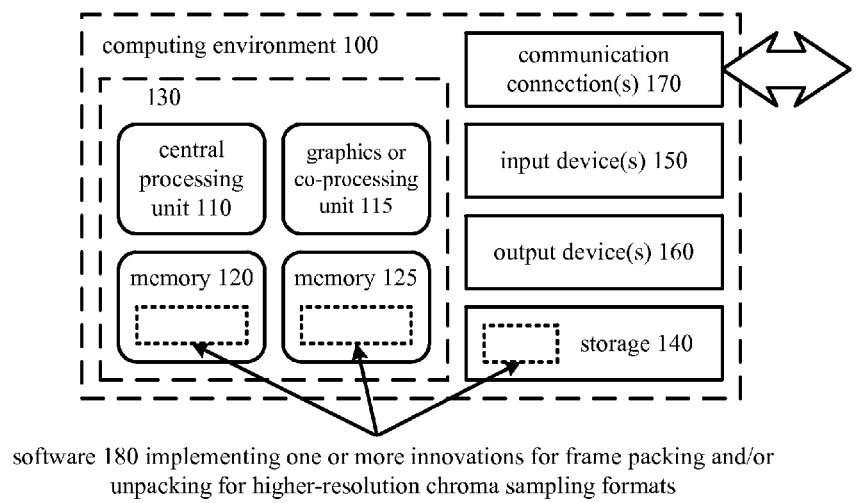
FIG. 1 is a diagram of an example computing system in which some described embodiments can be implemented.

A video source such as a camera, animation output, screen capture module, etc. typically provides video that is converted to a format such as a YUV 4:4:4 chroma sampling format (an example of a 4:4:4 format, more generally). A YUV format includes a luma (or Y) component with sample values representing approximate brightness values as well as multiple chroma (or U and V) components with sample values representing color difference values. The precise definitions of the color difference values (and conversion operations to/from a YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The component signal measures that are used may be adjusted through the application of a non-linear transfer characteristics function (generally known as "gamma pre-compensation" and often denoted by the use of a prime symbol, although the prime symbol is often omitted for typographical convenience). Or, the component signal measures may be in a domain that has a linear relationship with light amplitude. The luma and chroma component signals may be well aligned with the perception of brightness and color for the human visual system, or the luma and chroma component signals may somewhat deviate from such measures (e.g., as in the YCoCg variation, in which formulas are applied that simplify the computation of the color component values). Examples of YUV formats as described herein include those described in the international standards known as ITU-R BT.601, ITU-R BT.709, and ITU-R BT.2020. Examples of chroma sample types are shown in Figure E-1 of the H.264/AVC standard. A 4:4:4 format can be a YUV 4:4:4 format or format for another color space, such as RGB or GBR.

Many commercially available video encoders and decoders support only a YUV 4:2:0 chroma sampling format (an example of a 4:2:0 format, more generally). YUV 4:2:0 is a format that sub-samples chroma information compared to a YUV 4:4:4 format, which preserves full-resolution chroma information (that is, chroma information is represented at the same resolution as luma information). As a design principle, the decision to use a YUV 4:2:0 format for encoding/decoding is premised on the understanding that, for most use cases such as encoding/decoding of natural camera-captured video content, viewers do not ordinarily notice many visual differences between video encoded/decoded in a YUV 4:2:0 format and video encoded/decoded in a YUV 4:4:4 format. The compression advantages for the YUV 4:2:0 format, which has fewer samples per frame, are therefore compelling.

There are some use cases, however, for which the differences between the two formats are more easily perceived by viewers. For example, for encoding/decoding of computer screen text content (especially text rendered using ClearType technology), animated video content with artificial hard-edged boundaries, or certain features of video content more generally (such as scrolling titles and hard-edged graphics, or video with information concentrated in chroma channels), a 4:4:4 format may be preferable to a 4:2:0 format. The lack of widespread support for video codecs supporting 4:4:4 formats (especially with respect to hardware codec implementations) is a hindrance for these use cases.

The detailed description presents various approaches to packing frames of a higher-resolution chroma sampling format into frames of a lower-resolution chroma sampling format. The frames of the lower-resolution chroma sampling format can then be encoded using an encoder designed for the lower-resolution chroma sampling format. After decoding (using a decoder designed for the lower-resolution chroma sampling format), the frames at the lower-resolution chroma sampling format can be output for further processing and display. Or, after such decoding, the frames of the higher-resolution chroma sampling format can be recovered through frame unpacking for output and display. In many cases, these approaches alleviate the shortcomings of the prior approaches by preserving chroma information from the frames in the higher-resolution chroma sampling format, while leveraging commercially available codecs adapted for the lower-resolution chroma sampling format. In particular, widely available codecs with specialized, dedicated hardware can provide faster encoding/decoding with lower power consumption for YUV 4:4:4 video frames packed into YUV 4:2:0 video frames.

The described approaches can be used to preserve chroma information for frames of one chroma sampling format when encoding/decoding uses another chroma sampling format. Some examples described herein involve frame packing/unpacking of frames of a YUV 4:4:4 format for encoding/decoding using a codec adapted for a YUV 4:2:0 format. Other examples described herein involve frame packing/unpacking of frames of a YUV 4:2:2 format for encoding/decoding using a codec adapted for a YUV 4:2:0 format. More generally, the described approaches can be used for other chroma sampling formats. For example, in addition to variations of YUV color spaces such as Y'UV, YIQ, Y'IQ, YdbDr, YCbCr, YCoCg, etc. in sampling ratios such as 4:4:4, 4:2:2, 4:2:0, 4:1:1, 4:0:0, etc., the described approaches can be used for color spaces such as RGB, GBR, etc. in sampling ratios such as 4:4:4, 4:2:2, 4:2:0, 4:1:1, 4:0:0, etc. as the chroma sampling formats.

In example implementations, specific aspects of the innovations described herein include, but are not limited to, the following:

Packing a 4:4:4 frame into two 4:2:0 frames, and encoding the two 4:2:0 frames using a video encoder designed for 4:2:0 format.

Decoding the encoded frames using a video decoder designed for 4:2:0 format, and unpacking the two decoded 4:2:0 frames to form a decoded 4:4:4 frame.

Performing the packing for a YUV format such that a geometric correspondence is maintained between Y, U and V components for each of the two 4:2:0 frames.

Performing the packing for a YUV format such that one of the two 4:2:0 frames (a main view) represents the complete scene being represented by 4:4:4 frame, albeit with chroma components at a lower resolution, while the other 4:2:0 frame (an auxiliary view) packs the remaining chroma information.

Signaling an indication of use of the two 4:2:0 frames with a type of supplemental enhancement information ("SEI") message or other metadata, such that a decoder that processes this SEI message can output the 4:4:4 frame or the 4:2:0 frame that represents the scene.

Pre-processing and post-processing operations that can improve the quality of the final displayed frame for a YUV format when only one 4:2:0 frame (out of the two 4:2:0 frames) is used for final display. In conjunction with such pre-processing and post-processing operations, the 4:2:0 frames can have a higher bit depth for encoding/decoding, so as to avoid loss of chroma information in pre-processing and post-processing operations.

Packing a 4:2:2 frame into (two or less) 4:2:0 frames, and encoding the 4:2:0 frames using a video encoder designed for 4:2:0 format.

Decoding the encoded frames using a video decoder designed for 4:2:0 format, and unpacking the decoded 4:2:0 frames to form a decoded 4:2:2 frame.

In specific example implementations that use frame packing arrangement SEI messages, the definition of frame packing arrangement SEI message is extended to support representing 4:4:4 content in a nominally 4:2:0 bitstream. In some examples, one constituent frame (e.g., in a top-bottom packing or alternating-frame coding scheme) can be decoded compatibly as an ordinary 4:2:0 image, or can be supplemented with the data from another constituent frame to form a complete 4:4:4 image representation. Since YUV 4:2:0 is the most widely supported format in products (especially with respect to hardware codec implementations), having an effective way of conveying YUV 4:4:4 content through such decoders can provide the substantial benefit of enabling widespread near-term deployment of YUV 4:4:4 capabilities (especially for screen content coding). In example implementations, the samples of a 4:4:4 frame are packed into two 4:2:0 frames, and the two 4:2:0 frames are encoded as the constituent frames of a frame packing arrangement. For implementations that use the frame packing arrangement SEI message, the semantics of the content_interpretation_type syntax element are extended to signal this usage. The content_interpretation_type syntax element signals how to interpret the data that are packed using a packing arrangement, and the frame configuration for the packing arrangement is signaled with a different syntax element. Some approaches described herein have high practical value for applications involving screen content. Also, relative to native 4:4:4 encoding, some approaches described herein can provide the advantage of compatibility with the ordinary 4:2:0 decoding process that is expected to be more widely supported in decoding products.

Additional innovative aspects of frame packing and unpacking for higher-resolution chroma sampling formats are also described. The described techniques may be applied to additional applications other than video coding/decoding, such as still-image coding, medical scan content coding, multispectral imagery content coding, etc. Although operations described herein are in places described as being performed by an encoder (e.g., video encoder) or decoder (e.g., video decoder), in many cases the operations can alternatively be performed by another type of media processing tool.

Some of the innovations described herein are illustrated with reference to syntax elements and operations specific to the HEVC standard. For example, reference is made to the draft version JCTVC-I1003 of the HEVC standard—"High efficiency video coding (HEVC) text specification draft 7," JCTVC-I1003_d5, 9$^{th}$ meeting, Geneva, April 2012. The innovations described herein can also be implemented for other standards or formats. For example, innovations described herein can be implemented for the H.264/AVC standard using frame packing arrangement SEI messages.

More generally, various alternatives to the examples described herein are possible. For example, any of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit ("CPU"), processor in an application-specific integrated circuit or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for frame packing and/or unpacking for higher-resolution chroma sampling formats, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing system (100). The storage (140) stores instructions for the software (180) implementing one or more innovations for frame packing and/or unpacking for higher-resolution chroma sampling formats.

The input device(s) (150) may be a touch input device such as a keyboard, mouse, pen, or trackball, a voice input device, a scanning device, or another device that provides input to the computing system (100). For video encoding, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an application specific integrated circuit ("ASIC") (such as an ASIC digital signal process unit ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
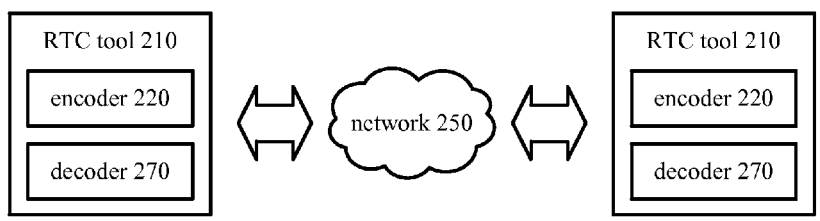
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the SMPTE 421M standard, ISO/IEC 14496-10 standard (also known as H.264/AVC), H.265/HEVC standard, another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

Figure 4:
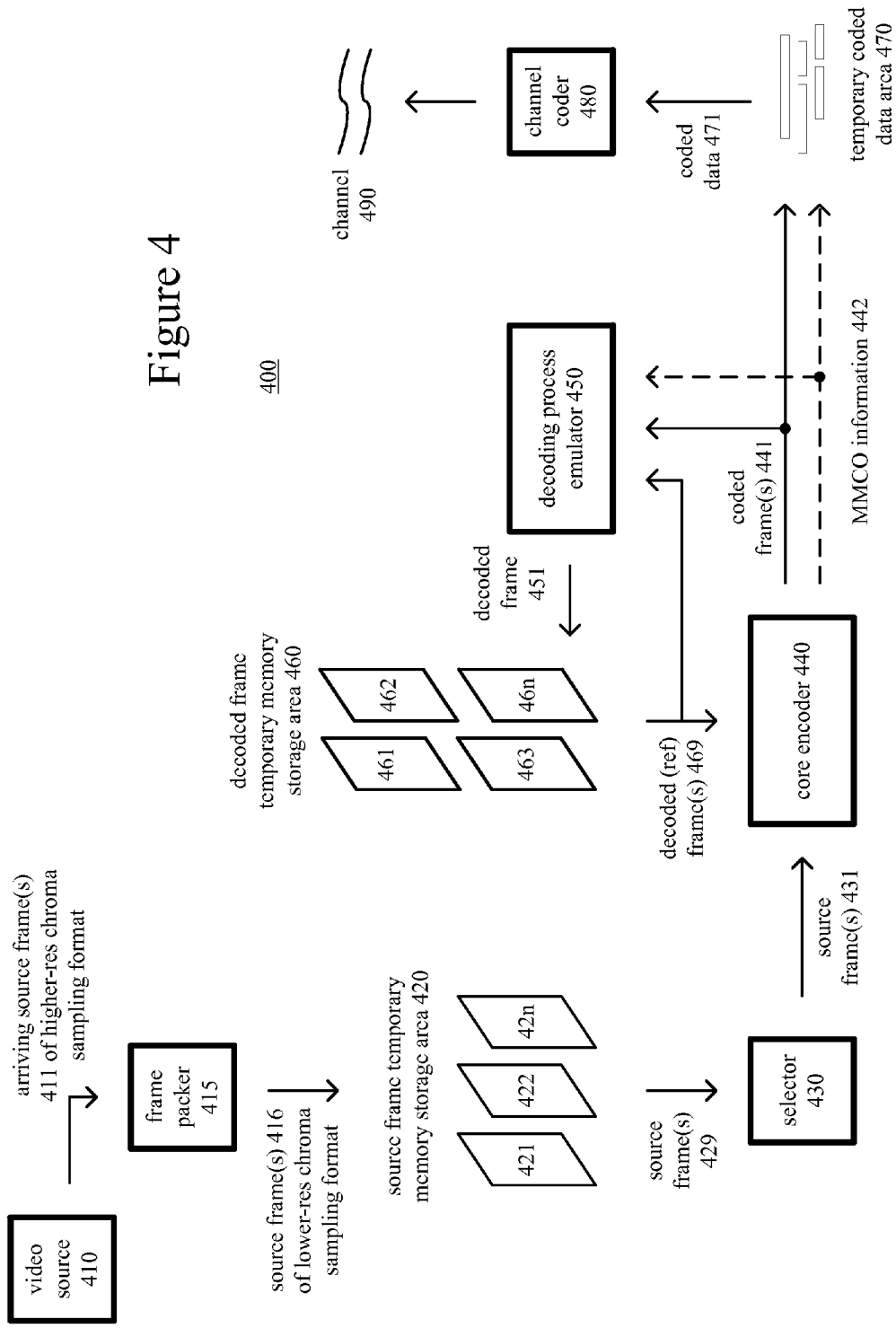
FIG. 4 is a diagram of an example encoder system in conjunction with which some described embodiments can be implemented.
Figure 5:
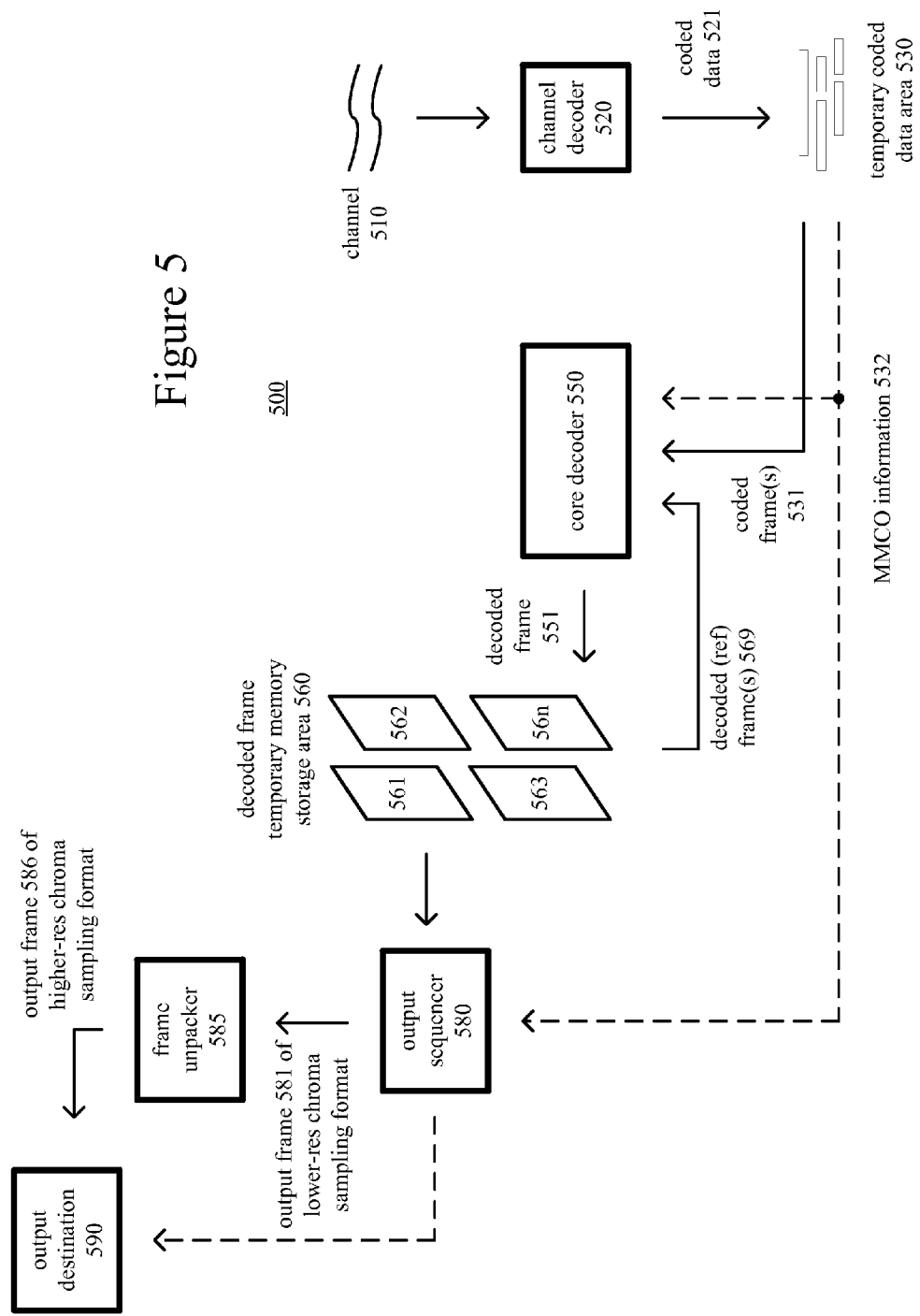
FIG. 5 is a diagram of an example decoder system in conjunction with which some described embodiments can be implemented.

A real-time communication tool (210) manages encoding by an encoder (220). FIG. 4 shows an example encoder system (400) that can be included in the real-time communication tool (210). Alternatively, the real-time communication tool (210) uses another encoder system. A real-time communication tool (210) also manages decoding by a decoder (270). FIG. 5 shows an example decoder system (500), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 4 shows an example encoder system (400) that can be included in the encoding tool (212). Alternatively, the encoding tool (212) uses another encoder system. The encoding tool (212) can also include server-side controller logic for managing connections with one or more playback tools (214). FIG. 5 shows an example decoder system (500), which can be included in the playback tool (214). Alternatively, the playback tool (214) uses another decoder system. A playback tool (214) can also include client-side controller logic for managing connections with the encoding tool (212).

III. Example Frame Packing/Unpacking Systems.

Figure 3:
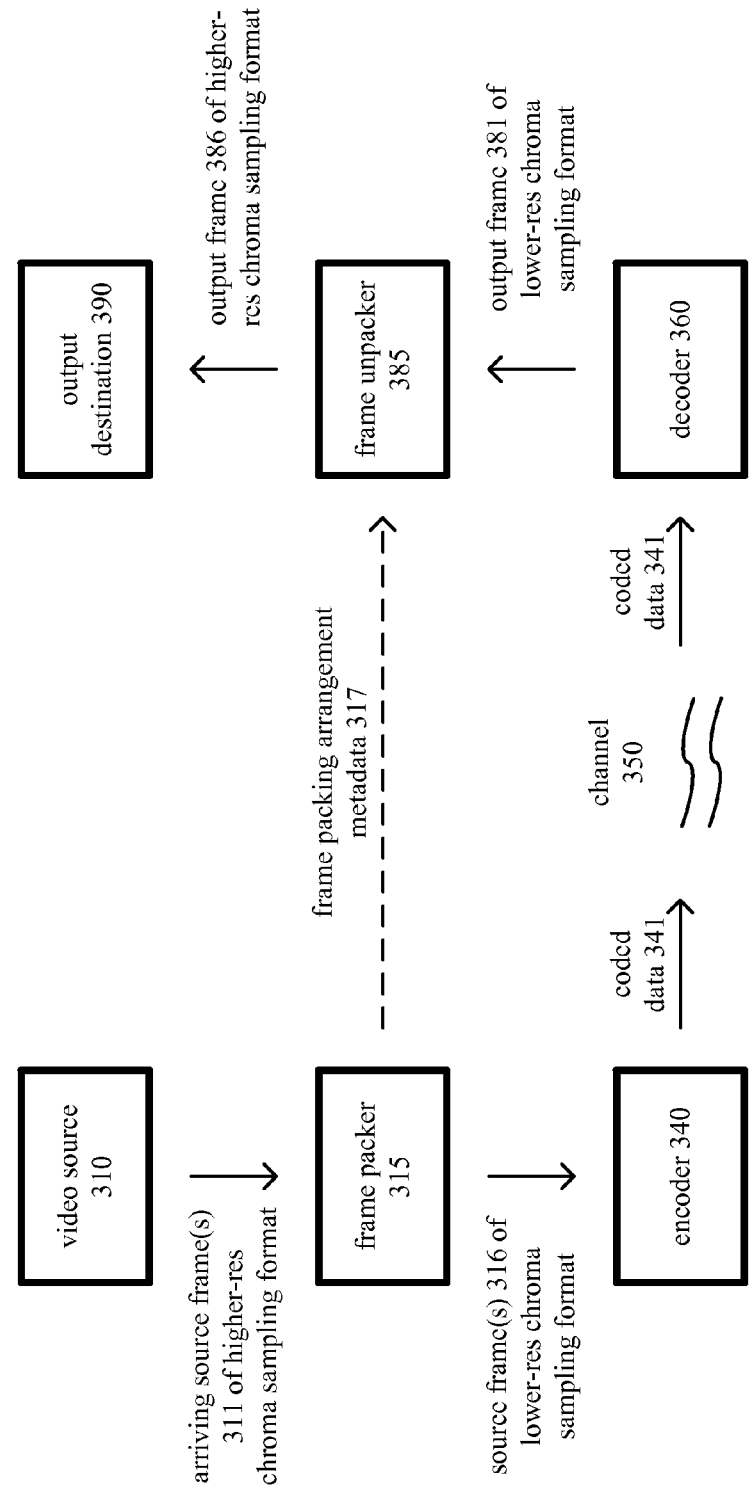
FIG. 3 is a diagram of a generalized frame packing/unpacking system in which some described embodiments can be implemented

FIG. 3 is a block diagram of a generalized frame packing/unpacking system (300) in conjunction with which some described embodiments may be implemented.

The system (300) includes a video source (310), which produces source frames (311) of a higher-resolution chroma sampling format such as a 4:4:4 format. The video source (310) can be a camera, tuner card, storage media, or other digital video source.

The frame packer (315) rearranges the frames (311) of the higher-resolution chroma sampling format to produce source frames (316) of a lower-resolution chroma sampling format such as a 4:2:0 format. Example approaches to frame packing are described below. The frame packer (315) can signal metadata (317) that indicates whether and how frame packing was performed, for use by the frame unpacker (385) after decoding. Example approaches to signaling frame packing arrangement metadata are described below.

The encoder (340) encodes the frames (316) of the lower-resolution chroma sampling format. Example encoders are described below with reference to FIGS. 4 and 6. The encoder (340) outputs coded data (341) over a channel (350), which represents storage, a communications connection, or another channel for the output.

The decoder (360) receives the encoded data (341) and decodes the frames (316) of the lower-resolution chroma sampling format. Example decoders are described below with reference to FIGS. 5 and 7. The decoder outputs reconstructed frames (381) of the lower-resolution chroma sampling format.

The frame unpacker (385) optionally rearranges the reconstructed frames (381) of the lower-resolution chroma sampling format to reconstruct the frames (386) of the higher-resolution chroma sampling format. Example approaches to frame unpacking are described below. The frame unpacker (385) can receive the metadata (317) that indicates whether and how frame packing was performed, and use such metadata (317) to guide unpacking operations. The frame unpacker (385) outputs the reconstructed frames of the higher-resolution chroma sampling format to an output destination (390).

IV. Example Encoder Systems.

FIG. 4 is a block diagram of an example encoder system (400) in conjunction with which some described embodiments may be implemented. The encoder system (400) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (400) can be implemented as an operating system module, as part of an application library or as a standalone application. Overall, the encoder system (400) receives a sequence of source video frames (411) (of a higher-resolution chroma sampling format such as a 4:4:4 format) from a video source (410), performs frame packing to a lower-resolution chroma sampling format such as a 4:2:0 format, encodes frames of the lower-resolution chroma sampling format, and produces encoded data as output to a channel (490).

The video source (410) can be a camera, tuner card, storage media, or other digital video source. The video source (410) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame is de-interlaced prior to encoding. Alternatively, two complementary interlaced video fields are encoded as an interlaced video frame or as separate fields. Aside from indicating a progressive-scan video frame, the term "frame" can indicate a single non-paired video field, a complementary pair of video fields, a video object plane that represents a video object at a given time, or a region of interest in a larger image. The video object plane or region can be part of a larger image that includes multiple objects or regions of a scene. After color space conversion from the capture format (e.g., an RGB format), the source frames (411) are in a higher-resolution chroma sampling format such as a 4:4:4 format.

The frame packer (415) rearranges the frames (411) of the higher-resolution chroma sampling format to produce source frames (416) of a lower-resolution chroma sampling format such as a 4:2:0 format. Example approaches to frame packing are described below. The frame packer (415) can signal metadata (not shown) that indicates whether and how frame packing was performed, for use by a frame unpacker after decoding. Example approaches to signaling frame packing arrangement metadata are described below. The frame packer (415) can perform pre-processing operations, for example, as described below.

An arriving source frame (416) is stored in a source frame temporary memory storage area (420) that includes multiple frame buffer storage areas (421, 422, . . . , 42n). A frame buffer (421, 422, etc.) holds one source frame in the source frame storage area (420). After one or more of the source frames (416) have been stored in frame buffers (421, 422, etc.), a frame selector (430) periodically selects an individual source frame from the source frame storage area (420). The order in which frames are selected by the frame selector (430) for input to the encoder (440) may differ from the order in which the frames are produced by the video source (410), e.g., a selected frame may be ahead in order, to facilitate temporally backward prediction.

The order of the frame packer (415) and frame storage area (420) can be switched. Before the encoder (440), the encoder system (400) can include another pre-processor (not shown) that performs pre-processing (e.g., filtering) of the selected frame (431) before encoding.

The encoder (440) encodes the selected frame (431) (of the lower-resolution chroma sampling format) to produce a coded frame (441) and also produces memory management control operation ("MMCO") signals (442) or reference picture set ("RPS") information. If the current frame is not the first frame that has been encoded, when performing its encoding process, the encoder (440) may use one or more previously encoded/decoded frames (469) that have been stored in a decoded frame temporary memory storage area (460). Such stored decoded frames (469) are used as reference frames for inter-frame prediction of the content of the current source frame (431). Generally, the encoder (440) includes multiple encoding modules that perform encoding tasks such as motion estimation and compensation, frequency transforms, quantization and entropy coding. The exact operations performed by the encoder (440) can vary depending on compression format. The format of the output encoded data can be a Windows Media Video format, VC-1 format, MPEG-x format (e.g., MPEG-1, MPEG-2, or MPEG-4), H.26x format (e.g., H.261, H.262, H.263, H.264), HEVC format or other format. In general, the encoder (440) is adapted for encoding frames of the lower-resolution chroma sampling format.

For example, within the encoder (440), an inter-coded, predicted frame is represented in terms of prediction from reference frames. A motion estimator estimates motion of sets of samples of a source frame (441) with respect to one or more reference frames (469). A set of samples can be a macroblock, sub-macroblock or sub-macroblock partition (as in the H.264 standard), or it can be a coding tree unit or prediction unit (as in the HEVC standard). Generally, as used herein, the term "block" indicates a set of samples, which may be a single two-dimensional ("2D") array or multiple 2D arrays (e.g., one array for a luma component and two arrays for chroma components). When multiple reference frames are used, the multiple reference frames can be from different temporal directions or the same temporal direction. The motion estimator outputs motion information such as motion vector information, which is entropy coded. A motion compensator applies motion vectors to reference frames to determine motion-compensated prediction values. The encoder determines the differences (if any) between a block's motion-compensated prediction values and corresponding original values. These prediction residual values (i.e., residuals, residue values) are further encoded using a frequency transform, quantization and entropy encoding. Similarly, for intra prediction, the encoder (440) can determine intra-prediction values for a block, determine prediction residual values, and encode the prediction residual values. The entropy coder of the encoder (440) compresses quantized transform coefficient values as well as certain side information (e.g., motion vector information, QP values, mode decisions, parameter choices). Typical entropy coding techniques include Exp-Golomb coding, arithmetic coding, differential coding, Huffman coding, run length coding, variable-length-to-variable-length ("V2V") coding, variable-length-to-fixed-length ("V2F") coding, LZ coding, dictionary coding, probability interval partitioning entropy coding ("PIPE"), and combinations of the above. The entropy coder can use different coding techniques for different kinds of information, and can choose from among multiple code tables within a particular coding technique.

The coded frames (441) and MMCO/RPS information (442) are processed by a decoding process emulator (450). The decoding process emulator (450) implements some of the functionality of a decoder, for example, decoding tasks to reconstruct reference frames that are used by the encoder (440) in motion estimation and compensation. The decoding process emulator (450) uses the MMCO/RPS information (442) to determine whether a given coded frame (441) needs to be stored for use as a reference frame in inter-frame prediction of subsequent frames to be encoded. If the MMCO/RPS information (442) indicates that a coded frame (441) needs to be stored, the decoding process emulator (450) models the decoding process that would be conducted by a decoder that receives the coded frame (441) and produces a corresponding decoded frame (451). In doing so, when the encoder (440) has used decoded frame(s) (469) that have been stored in the decoded frame storage area (460), the decoding process emulator (450) also uses the decoded frame(s) (469) from the storage area (460) as part of the decoding process.

The decoded frame temporary memory storage area (460) includes multiple frame buffer storage areas (461, 462, . . . , 46*n*). The decoding process emulator (450) uses the MMCO/RPS information (442) to manage the contents of the storage area (460) in order to identify any frame buffers (461, 462, etc.) with frames that are no longer needed by the encoder (440) for use as reference frames. After modeling the decoding process, the decoding process emulator (450) stores a newly decoded frame (451) in a frame buffer (461, 462, etc.) that has been identified in this manner.

The coded frames (441) and MMCO/RPS information (442) are also buffered in a temporary coded data area (470). The coded data that is aggregated in the coded data area (470) can also include media metadata relating to the coded video data (e.g., as one or more parameters in one or more SEI messages (such as frame packing arrangement SEI messages) or video usability information ("VUI") messages).

The aggregated data (471) from the temporary coded data area (470) are processed by a channel encoder (480). The channel encoder (480) can packetize the aggregated data for transmission as a media stream (e.g., according to a media container format such as ISO/IEC 14496-12), in which case the channel encoder (480) can add syntax elements as part of the syntax of the media transmission stream. Or, the channel encoder (480) can organize the aggregated data for storage as a file (e.g., according to a media container format such as ISO/IEC 14496-12), in which case the channel encoder (480) can add syntax elements as part of the syntax of the media storage file. Or, more generally, the channel encoder (480) can implement one or more media system multiplexing protocols or transport protocols, in which case the channel encoder (480) can add syntax elements as part of the syntax of the protocol(s). Such syntax elements for a media transmission stream, media storage stream, multiplexing protocols or transport protocols can include frame packing arrangement metadata. The channel encoder (480) provides output to a channel (490), which represents storage, a communications connection, or another channel for the output.

V. Example Decoder Systems.

FIG. 5 is a block diagram of an example decoder system (500) in conjunction with which some described embodiments may be implemented. The decoder system (500) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (500) can be implemented as an operating system module, as part of an application library or as a standalone application. Overall, the decoder system (500) receives coded data from a channel (510), decodes frames of a lower-resolution chroma sampling format such as a 4:2:0 format, optionally performs frame unpacking from the lower-resolution chroma sampling format to a higher-resolution chroma sampling format such as a 4:4:4 format, and produces reconstructed frames (of the higher-resolution chroma sampling format) as output for an output destination (590).

The decoder system (500) includes a channel (510), which can represent storage, a communications connection, or another channel for coded data as input. The channel (510) produces coded data that has been channel coded. A channel decoder (520) can process the coded data. For example, the channel decoder (520) de-packetizes data that has been aggregated for transmission as a media stream (e.g., according to a media container format such as ISO/IEC 14496-12), in which case the channel decoder (520) can parse syntax elements added as part of the syntax of the media transmission stream. Or, the channel decoder (520) separates coded video data that has been aggregated for storage as a file (e.g., according to a media container format such as ISO/IEC 14496-12), in which case the channel decoder (520) can parse syntax elements added as part of the syntax of the media storage file. Or, more generally, the channel decoder (520) can implement one or more media system demultiplexing protocols or transport protocols, in which case the channel decoder (520) can parse syntax elements added as part of the syntax of the protocol(s). Such syntax elements for a media transmission stream, media storage stream, multiplexing protocols or transport protocols can include frame packing arrangement metadata.

The coded data (521) that is output from the channel decoder (520) is stored in a temporary coded data area (530) until a sufficient quantity of such data has been received. The coded data (521) includes coded frames (531) (at the lower-resolution chroma sampling format) and MMCO/RPS information (532). The coded data (521) in the coded data area (530) can also include media metadata relating to the encoded video data (e.g., as one or more parameters in one or more SEI messages such as frame packing arrangement SEI messages or VUI messages). In general, the coded data area (530) temporarily stores coded data (521) until such coded data (521) is used by the decoder (550). At that point, coded data for a coded frame (531) and MMCO/RPS information (532) are transferred from the coded data area (530) to the decoder (550). As decoding continues, new coded data is added to the coded data area (530) and the oldest coded data remaining in the coded data area (530) is transferred to the decoder (550).

The decoder (550) periodically decodes a coded frame (531) to produce a corresponding decoded frame (551) of the lower-resolution chroma sampling format. As appropriate, when performing its decoding process, the decoder (550) may use one or more previously decoded frames (569) as reference frames for inter-frame prediction. The decoder (550) reads such previously decoded frames (569) from a decoded frame temporary memory storage area (560). Generally, the decoder (550) includes multiple decoding modules that perform decoding tasks such as entropy decoding, inverse quantization, inverse frequency transforms and motion compensation. The exact operations performed by the decoder (550) can vary depending on compression format. In general, the decoder (550) is adapted for decoding frames of the lower-resolution chroma sampling format.

For example, the decoder (550) receives encoded data for a compressed frame or sequence of frames and produces output including decoded frame (551) of the lower-resolution chroma sampling format. In the decoder (550), a buffer receives encoded data for a compressed frame and makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated predictions of blocks (e.g., macroblocks, sub-macroblocks, sub-macroblock partitions, coding tree units, prediction units, or parts thereof) of the frame being reconstructed. An intra prediction module can spatially predict sample values of a current block from neighboring, previously reconstructed sample values. The decoder (550) also reconstructs prediction residuals. An inverse quantizer inverse quantizes entropy-decoded data. An inverse frequency transformer converts the quantized, frequency domain data into spatial domain information. For a predicted frame, the decoder (550) combines reconstructed prediction residuals with motion-compensated predictions to form a reconstructed frame. The decoder (550) can similarly combine prediction residuals with spatial predictions from intra prediction. A motion compensation loop in the video decoder (550) includes an adaptive de-blocking filter to smooth discontinuities across block boundary rows and/or columns in the decoded frame (551).

The decoded frame temporary memory storage area (560) includes multiple frame buffer storage areas (561, 562, . . . , 56n). The decoded frame storage area (560) is an example of a DPB. The decoder (550) uses the MMCO/RPS information (532) to identify a frame buffer (561, 562, etc.) in which it can store a decoded frame (551) of the lower-resolution chroma sampling format. The decoder (550) stores the decoded frame (551) in that frame buffer.

An output sequencer (580) uses the MMCO/RPS information (532) to identify when the next frame to be produced in output order is available in the decoded frame storage area (560). When the next frame (581) of the lower-resolution chroma sampling format to be produced in output order is available in the decoded frame storage area (560), it is read by the output sequencer (580) and output to either (a) the output destination (590) (e.g., display) for display of the frame of the lower-resolution chroma sampling format, or (b) the frame unpacker (585). In general, the order in which frames are output from the decoded frame storage area (560) by the output sequencer (580) may differ from the order in which the frames are decoded by the decoder (550).

The frame unpacker (585) rearranges the frames (581) of the lower-resolution chroma sampling format to produce output frames (586) of a higher-resolution chroma sampling format such as a 4:4:4 format. Example approaches to frame unpacking are described below. The frame packer (585) can use metadata (not shown) that indicates whether and how frame packing was performed, to guide frame unpacking operations. The frame unpacker (585) can perform post-processing operations, for example, as described below.

VI. Example Video Encoders.

Figure 6:
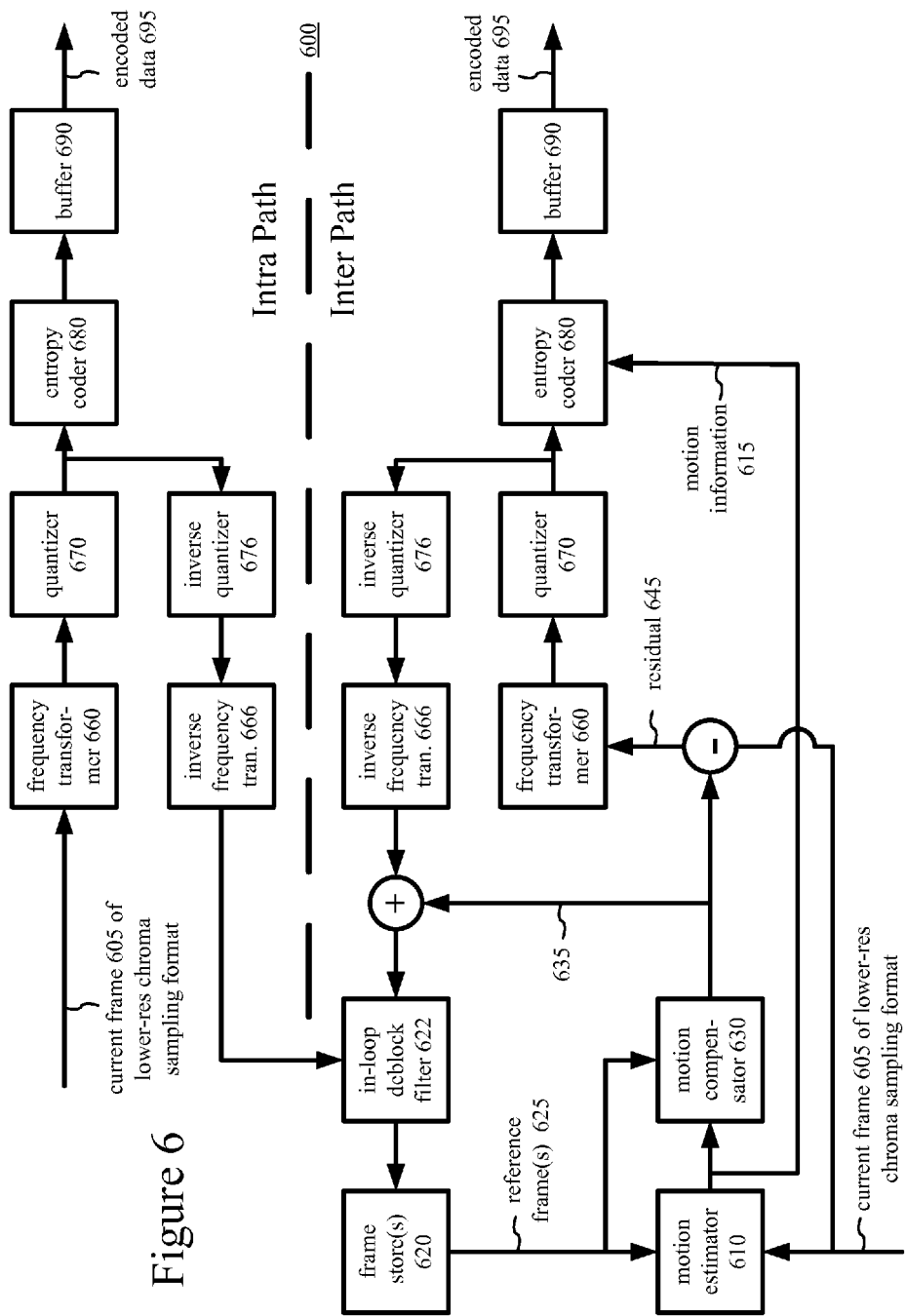
FIG. 6 is a diagram illustrating an example video encoder in conjunction with which some described embodiments can be implemented.

FIG. 6 is a block diagram of a generalized video encoder (600) in conjunction with which some described embodiments may be implemented. The encoder (600) receives a sequence of video frames of a lower-resolution chroma sampling format such as a 4:2:0 format, including a current frame (605), and produces encoded data (695) as output.

The encoder (600) is block-based and uses a macroblock format that depends on implementation. Blocks may be further sub-divided at different stages, e.g., at the frequency transform and entropy encoding stages. For example, a frame can be divided into 16×16 macroblocks, which can in turn be divided into 8×8 blocks and smaller sub-blocks of pixel values for coding and decoding.

The encoder system (600) compresses predicted frames and intra-coded frames. For the sake of presentation, FIG. 6 shows an "intra path" through the encoder (600) for intra-frame coding and an "inter path" for inter-frame coding. Many of the components of the encoder (600) are used for both intra-frame coding and inter-frame coding. The exact operations performed by those components can vary depending on the type of information being compressed.

If the current frame (605) is a predicted frame, a motion estimator (610) estimates motion of blocks (e.g., macroblocks, sub-macroblocks, sub-macroblock partitions, coding tree units, prediction units, or parts thereof) of the current frame (605) with respect to one or more reference frames. The frame store (620) buffers one or more reconstructed previous frames (625) for use as reference frames. When multiple reference frames are used, the multiple reference frames can be from different temporal directions or the same temporal direction. The motion estimator (610) outputs as side information motion information (615) such as differential motion vector information.

The motion compensator (630) applies reconstructed motion vectors to the reconstructed reference frame(s) (625) when forming a motion-compensated current frame (635). The difference (if any) between a block of the motion-compensated current frame (635) and corresponding part of the original current frame (605) is the prediction residual (645) for the block. During later reconstruction of the current frame, reconstructed prediction residuals are added to the motion-compensated current frame (635) to obtain a reconstructed frame that is closer to the original current frame (605). In lossy compression, however, some information is still lost from the original current frame (605). The intra path can include an intra prediction module (not shown) that spatially predicts pixel values of a current block from neighboring, previously reconstructed pixel values.

A frequency transformer (660) converts spatial domain video information into frequency domain (i.e., spectral, transform) data. For block-based video frames, the frequency transformer (660) applies a discrete cosine transform, an integer approximation thereof, or another type of forward block transform to blocks of pixel value data or prediction residual data, producing blocks of frequency transform coefficients. A quantizer (670) then quantizes the transform coefficients. For example, the quantizer (670) applies non-uniform, scalar quantization to the frequency domain data with a step size that varies on a frame-by-frame basis, macroblock-by-macroblock basis or other basis.

When a reconstructed version of the current frame is needed for subsequent motion estimation/compensation, an inverse quantizer (676) performs inverse quantization on the quantized frequency coefficient data. The inverse frequency transformer (666) performs an inverse frequency transform, producing blocks of reconstructed prediction residuals or pixel values. For a predicted frame, the encoder (600) combines reconstructed prediction residuals (645) with motion-compensated predictions (635) to form the reconstructed frame (605). (Although not shown in FIG. 6, in the intra path, the encoder (600) can combine prediction residuals with spatial predictions from intra prediction.) The frame store (620) buffers the reconstructed current frame for use in subsequent motion-compensated prediction.

A motion compensation loop in the encoder (600) includes an adaptive in-loop deblock filter (622) before or after the frame store (620). The decoder (600) applies in-loop filtering to reconstructed frames to adaptively smooth discontinuities across boundaries in the frames. The adaptive in-loop deblock filter (622) can be disabled for some types of content. For example, in a frame packing approach with main and auxiliary views, the adaptive in-loop deblock filter (622) can be disabled when encoding an auxiliary view (including remaining chroma information that is not part of a main view) so as to not introduce artifacts such as blurring.

The entropy coder (680) compresses the output of the quantizer (670) as well as motion information (615) and certain side information (e.g., QP values). The entropy coder (680) provides encoded data (695) to the buffer (690), which multiplexes the encoded data into an output bitstream.

A controller (not shown) receives inputs from various modules of the encoder. The controller evaluates intermediate results during encoding, for example, setting QP values and performing rate-distortion analysis. The controller works with other modules to set and change coding parameters during encoding. In particular, the controller can vary QP values and other control parameters to control quantization of luma components and chroma components during encoding. For example, the controller can vary QP values to dedicate more bits to luma content of a given frame (which could be a main view or auxiliary view in a frame packing approach) compared to chroma content of that frame. Or, in a frame packing approach with main and auxiliary views, the controller can vary QP values to dedicate more bits to the main view (including luma and sub-sampled chroma components) compared to the auxiliary view (including remaining chroma information).

In some approaches to frame packing, even after chroma information from frames in a higher-resolution chroma sampling format has been packed into to-be-encoded frames of the lower-resolution chroma sampling format, the encoder can exploit geometric correspondence among sample values of the chroma components in several ways. The term geometric correspondence indicates a relationship between (1) chroma information at positions of a (nominally) luma component of a frame constructed from the lower-resolution chroma sampling format and (2) chroma information at corresponding scaled positions of chroma components of the frame of the lower-resolution chroma sampling format. A scaling factor applies between positions of the luma and chroma components. For example, for 4:2:0, the scaling factor is two both horizontally and vertically, and for 4:2:2, the scaling factor is two horizontally and one vertically.

The encoder can use the geometric correspondence to guide motion estimation, QP selection, prediction mode selection or other decision-making processes from block-to-block, by first evaluating recent results of neighboring blocks when encoding a current block of the to-be-encoded frame. Or, the encoder can use the geometric correspondence to guide such decision-making processes for high-resolution chroma information packed into chroma components of the to-be-encoded frame, using results from encoding of high-resolution chroma information packed into a "luma" component of the to-be-encoded frame. Or, more directly, the encoder can use the geometric correspondence to improve compression performance, where motion vectors, prediction modes, or other decisions for high-resolution chroma information packed into a "luma" component of the to-be-encoded frame are also used for high-resolution chroma information packed into chroma components of the to-be-encoded frame. In particular, in some approaches described herein (e.g., approach 2, below), when chroma information is packed into an auxiliary frame of the lower-resolution chroma sampling format, spatial correspondence and motion vector displacement relationships between the nominally luma component of the auxiliary frame and nominally chroma components of the auxiliary frame are preserved. Sample values at corresponding spatial positions in Y, U and V components of the auxiliary frame tend to be consistent, which is useful for such purposes as spatial block size segmentation and joint coding of coded block pattern information or other information that indicates presence/absence of non-zero coefficient values. Motion vectors for corresponding parts of Y, U and V components of the auxiliary frame tend to be consistent (e.g., a vertical or horizontal displacement of two samples in Y corresponds to a displacement of 1 sample in U and V), which also helps coding efficiency.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (600). The relationships shown between modules within the encoder (600) indicate general flows of information in the encoder; other relationships are not shown for the sake of simplicity.

VII. Example Video Decoders.

Figure 7:
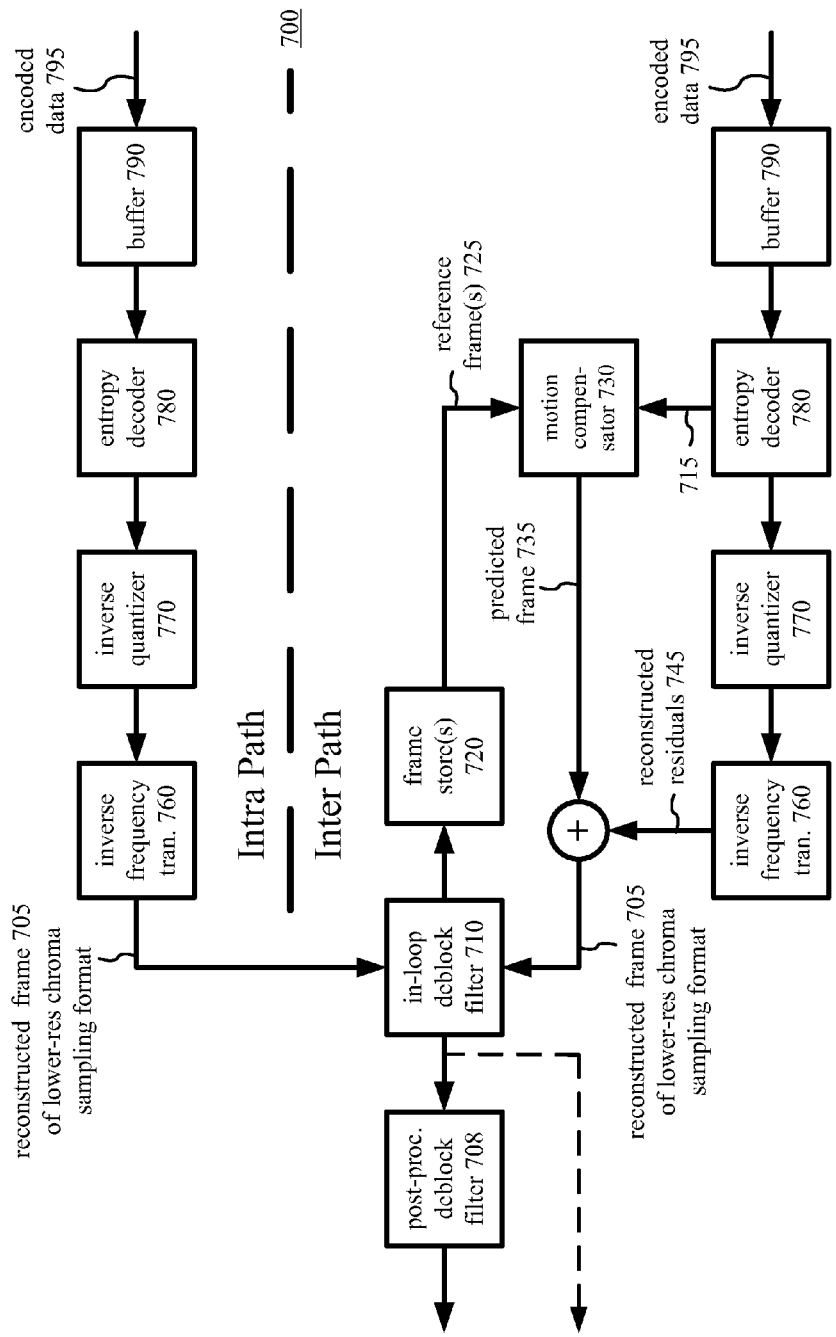
FIG. 7 is a diagram illustrating an example video decoder in conjunction with which some described embodiments can be implemented.

FIG. 7 is a block diagram of a generalized decoder (700) in conjunction with which several described embodiments may be implemented. The decoder (700) receives encoded data (795) for a compressed frame or sequence of frames and produces output including a reconstructed frame (705) of a lower-resolution chroma sampling format such as a 4:2:0 format. For the sake of presentation, FIG. 7 shows an "intra path" through the decoder (700) for intra-frame decoding and an "inter path" for inter-frame decoding. Many of the components of the decoder (700) are used for both intra-frame decoding and inter-frame decoding. The exact operations performed by those components can vary depending on the type of information being decompressed.

A buffer (790) receives encoded data (795) for a compressed frame and makes the received encoded data available to the parser/entropy decoder (780). The parser/entropy decoder (780) entropy decodes entropy-coded quantized data as well as entropy-coded side information, typically applying the inverse of entropy encoding performed in the encoder.

A motion compensator (730) applies motion information (715) to one or more reference frames (725) to form motion-compensated predictions (735) of blocks (e.g., macroblocks, sub-macroblocks, sub-macroblock partitions, coding tree units, prediction units, or parts thereof) of the frame (705) being reconstructed. The frame store (720) stores one or more previously reconstructed frames for use as reference frames.

The intra path can include an intra prediction module (not shown) that spatially predicts pixel values of a current block from neighboring, previously reconstructed pixel values. In the inter path, the decoder (700) reconstructs prediction residuals. An inverse quantizer (770) inverse quantizes entropy-decoded data. An inverse frequency transformer (760) converts the quantized, frequency domain data into spatial domain information. For example, the inverse frequency transformer (760) applies an inverse block transform to frequency transform coefficients, producing pixel value data or prediction residual data. The inverse frequency transform can be an inverse discrete cosine transform, an integer approximation thereof, or another type of inverse frequency transform.

For a predicted frame, the decoder (700) combines reconstructed prediction residuals (745) with motion-compensated predictions (735) to form the reconstructed frame (705). (Although not shown in FIG. 7, in the intra path, the decoder (700) can combine prediction residuals with spatial predictions from intra prediction.) A motion compensation loop in the decoder (700) includes an adaptive in-loop deblock filter (710) before or after the frame store (720). The decoder (700) applies in-loop filtering to reconstructed frames to adaptively smooth discontinuities across boundaries in the frames. The adaptive in-loop deblock filter (710) can be disabled for some types of content, when it was disabled during encoding. For example, in a frame packing approach with main and auxiliary views, the adaptive in-loop deblock filter (710) can be disabled when decoding an auxiliary view (including remaining chroma information that is not part of a main view).

In FIG. 7, the decoder (700) also includes a post-processing deblock filter (708). The post-processing deblock filter (708) optionally smoothes discontinuities in reconstructed frames. Other filtering (such as de-ring filtering) can also be applied as part of the post-processing filtering. Typically, reconstructed frames that are subjected to later frame unpacking bypass the post-processing deblock filter (708).

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (700). The relationships shown between modules within the decoder (700) indicate general flows of information in the decoder; other relationships are not shown for the sake of simplicity.

VIII. Frame Packing/Unpacking for Higher-Resolution Chroma Sampling Formats.

This section describes various approaches to packing frames of a higher-resolution chroma sampling format into frames of a lower-resolution chroma sampling format. The frames of the lower-resolution chroma sampling format can then be encoded using an encoder designed for the lower-resolution chroma sampling format. After decoding (using a decoder designed for the lower-resolution chroma sampling format), the frames at the lower-resolution chroma sampling format can be output for further processing and display. Or, after such decoding, the frames of the higher-resolution chroma sampling format can be recovered through frame unpacking for output and display.

A. Approaches to Frame Packing/Unpacking for YUV 4:4:4 Video.

Various approaches described herein can be used to preserve chroma information for frames of a 4:4:4 format when encoding/decoding uses a 4:2:0 format, as one specific example. In these approaches, for example, a YUV 4:4:4 frame is packed into two YUV 4:2:0 frames. A typical 4:4:4 frame contains 12 sample values for every 4 pixel positions, while a 4:2:0 frame contains only 6 sample values for every 4 pixel positions. So, all the sample values contained in a 4:4:4 frame can be packed into two 4:2:0 frames.

1. Approach 1.

Figure 8:
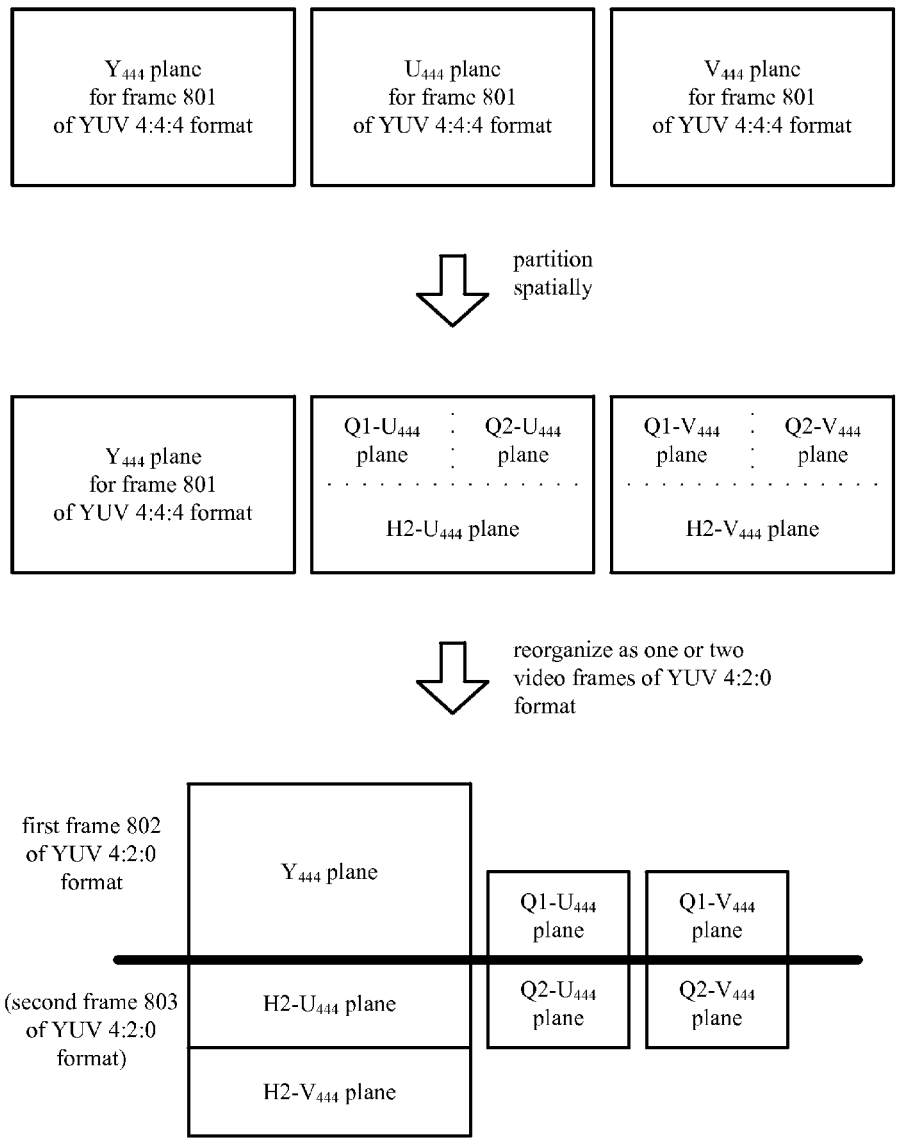
FIG. 8 is a diagram illustrating an example approach to frame packing that uses spatial partitioning of frames.

In approach 1, a YUV 4:4:4 frame is packed into two YUV 4:2:0 frames using spatial partitioning. FIG. 8 shows this approach (800) to frame packing that uses spatial partitioning of the YUV 4:4:4 frame.

A $Y_{444}$ plane, $U_{444}$ plane, and $V_{444}$ plane are the three component planes for the YUV 4:4:4 frame (801). Each plane has the resolution of width W and height H. For convenience in describing the examples used herein, both W and H are divisible by 4, without implying that this is a limitation of the approach. The approach (800) to packing the YUV 4:4:4 frame into two YUV 4:2:0 frames splits the YUV 4:4:4 frame as shown in FIG. 8. The $U_{444}$ plane of the YUV 4:4:4 frame (801) is partitioned into a bottom half $H2-U_{444}$ and two upper quarters $Q1-U_{444}$ and $Q2-U_{444}$ using spatial partitioning. The $V_{444}$ plane of the YUV 4:4:4 frame (801) is partitioned into a bottom half $H2-V_{444}$ and two upper quarters $Q1-V_{444}$ and $Q2-V_{444}$ using spatial partitioning.

The partitioned planes of the YUV 4:4:4 frame (801) are then reorganized as one or more YUV 4:2:0 frames. The $Y_{444}$ plane for the YUV 4:4:4 frames becomes the luma component plane of a first frame (802) of the YUV 4:2:0 format. The bottom halves of the $U_{444}$ plane and the $V_{444}$ plane become the luma component plane of a second frame (803) of the YUV 4:2:0 format. The top quarters of the $U_{444}$ plane and the $V_{444}$ plane become the chroma component planes of the first frame (802) and second frame (803) of the YUV 4:2:0 format as shown in FIG. 8.

The first frame (802) and second frame (803) of the YUV 4:2:0 format can be organized as separate frames (separated by the dark line in FIG. 8). Or, the first frame (802) and second frame (803) of the YUV 4:2:0 format can be organized as a single frame having a height of 2×H (ignoring the dark line in FIG. 8). Or, the first frame (802) and second frame (803) of the YUV 4:2:0 format can be organized as a single frame having a width of 2×W. Or, the first frame (802) and second frame (803) of the YUV 4:2:0 format can be organized as a single frame or multiple frames using any of the methods defined for frame_packing_arrangement_type in the H.264/AVC standard or the HEVC standard.

Although this type of frame packing works, it does not result in geometric correspondence between Y, U and V components within each of the two YUV 4:2:0 frames. In particular, for the second frame (803) of the YUV 4:2:0 format, there is typically not a geometric correspondence between the luma component and chroma components. Other packing approaches described herein typically achieve much better geometric correspondence.

Alternatively, Approach 1 can be used for color spaces such as RGB, GBR, etc. in sampling ratios such as 4:4:4, 4:2:2, 4:2:0, etc., as the chroma sampling formats.

2. Approach 2.

In approach 2, a YUV 4:4:4 frame is packed into two YUV 4:2:0 frames while maintaining geometric correspondence for chroma information of the YUV 4:4:4 frame. YUV 4:2:0 frames with good geometric correspondence among their Y, U and V components can be compressed better because they fit the model expected by a typical encoder adapted to encode YUV 4:2:0 frames.

The packing can also be done such that one of the two YUV 4:2:0 frames represents the complete scene being represented by the YUV 4:4:4 frame, albeit with color components at a lower resolution. This provides options in decoding. A decoder that cannot perform frame unpacking, or chooses not to perform frame unpacking, can just take a reconstructed version of the YUV 4:2:0 frame that represents the scene and directly feed it to the display.

Figure 9:
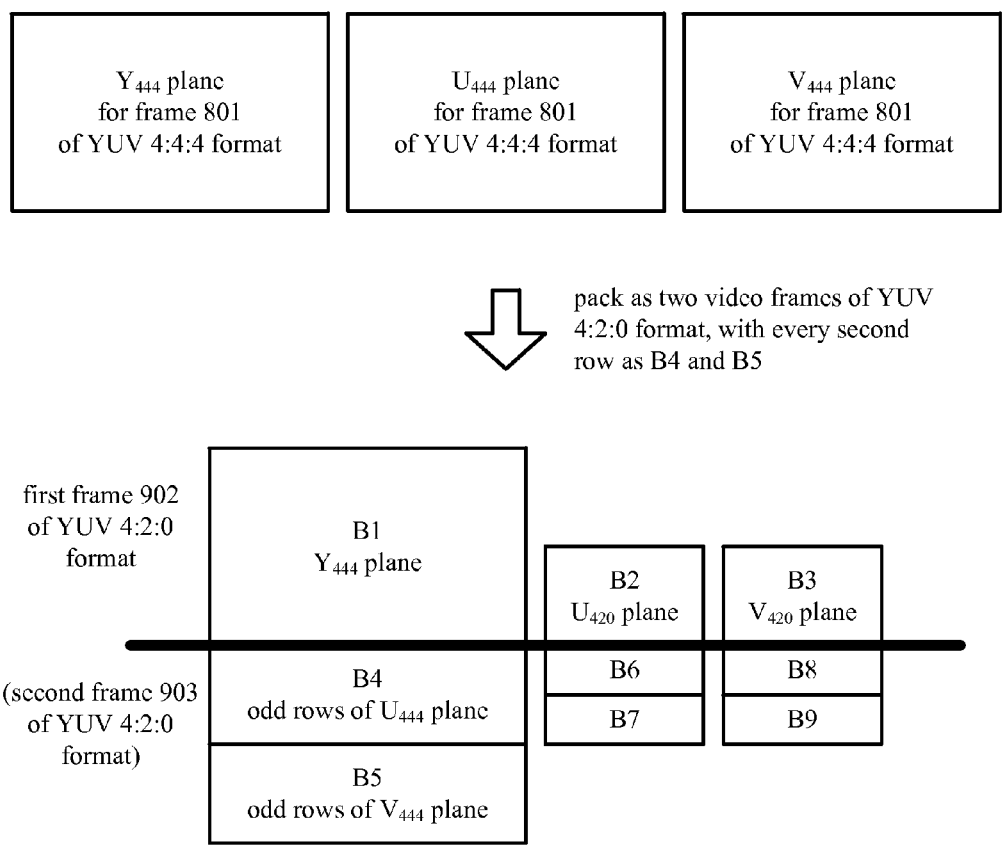
FIG. 9 is a diagram illustrating an example approach to frame packing in which every second row of chroma component planes of frames of a higher-resolution chroma sampling format is copied.

FIG. 9 illustrates one example approach (900) to frame packing that is consistent with these design constraints. In this approach (900), a YUV 4:4:4 frame (801) is packed into two YUV 4:2:0 frames (902, 903). The first frame (902) provides a "main view" in YUV 4:2:0 format—a lower chroma resolution version of the complete scene represented by the YUV 4:4:4 frame (801). The second frame (903) provides an "auxiliary view" in YUV 4:2:0 format and contains remaining chroma information.

In FIG. 9, the areas B1 . . . B9 are different areas within the respective frames (902, 903) of YUV 4:2:0 format. The sample values of odd rows of the $U_{444}$ plane and $V_{444}$ plane of the YUV 4:4:4 frame (801) are assigned to the areas B4 and B5, and the sample values of even rows of the $U_{444}$ plane and $V_{444}$ plane of the YUV 4:4:4 frame (801) are distributed between the areas B2, B3 and B6 . . . B9. Specifically, sample values of the $Y_{444}$ plane, $U_{444}$ plane, and $V_{444}$ plane of the YUV 4:4:4 frame (801) map to the areas B1 . . . B9 as follows.

For area B1, $Y_{420}^{main}(x, y) = Y_{444}(x, y)$, where the range of (x, y) is [0, W−1]×[0, H−1].

For area B2, $U_{420}^{main}(x, y) = U_{444}(2x, 2y)$, where the range of (x, y) is $$\left[0, \frac{W}{2} - 1\right] \times \left[0, \frac{H}{2} - 1\right].$$

For area B3, $V_{420}^{main}(x, y) = V_{444}(2x, 2y)$, where the range of (x, y) is $$\left[0, \frac{W}{2} - 1\right] \times \left[0, \frac{H}{2} - 1\right].$$

For area B4, $Y_{420}^{aux}(x, y) = U_{444}(x, 2y+1)$, where the range of (x, y) is $$[0, W - 1] \times \left[0, \frac{H}{2} - 1\right].$$

For area B5, $$Y_{420}^{aux}\left(x, \frac{H}{2} + y\right) = V_{444}(x, 2y + 1),$$

where the range of (x, y) is $$[0, W - 1] \times \left[0, \frac{H}{2} - 1\right].$$

For area B6, $U_{420}^{aux}(x, y) = U_{444}(2x+1, 4y)$, where the range of (x, y) is $$\left[0, \frac{W}{2} - 1\right] \times \left[0, \frac{H}{4} - 1\right].$$

For area B7, $$U_{420}^{aux}\left(x, \frac{H}{4} + y\right) = V_{444}(2x + 1, 4y),$$

where the range of (x, y) is $$\left[0, \frac{W}{2} - 1\right] \times \left[\left[0, \frac{H}{4} - 1\right]\right].$$

For area B8, $V_{420}^{aux}(x, y) = U_{444}(2x+1, 4y+2)$, where the range of (x, y) is $$\left[0, \frac{W}{2} - 1\right] \times \left[0, \frac{H}{4} - 1\right].$$

For area B9, $$V_{420}^{aux}\left(x, \frac{H}{4} + y\right) = V_{444}(2x+1, 4y+2),$$

where the range of (x, y) is $$\left[0, \frac{W}{2} - 1\right] \times \left[0, \frac{H}{4} - 1\right].$$

Alternatively, the sample values of the $Y_{444}$ plane, $U_{444}$ plane, and $V_{444}$ plane of the YUV 4:4:4 frame (801) can be assigned to the areas B1 . . . B9 in a different way. For example, the sample values of even rows of the $U_{444}$ plane and $V_{444}$ plane of the YUV 4:4:4 frame (801) are assigned to the areas B4 and B5, and the sample values of odd rows of the $U_{444}$ plane and $V_{444}$ plane of the YUV 4:4:4 frame (801) are distributed between the areas B2, B3 and B6 . . . B9. Or, as another example, data from the original U plane of the YUV 4:4:4 frame can be arranged in the U plane of the auxiliary YUV 4:2:0 frame, and data from the original V plane of the YUV 4:4:4 frame can be arranged in the V plane of the auxiliary YUV 4:2:0 frame. In this example, compared to FIG. 9, the sample values from $V_{444}(2x+1, 4y)$ that are assigned to area B7 in the equations above can instead be assigned to area B8, and the sample values from $U_{444}(2x+1, 4y+2)$ that are assigned to area B8 in the equations above can instead be assigned to area B7. Or, the same sample values from $U_{444}$ can be copied into a single area for B6 and B7 without separating every second row, and the same sample values from $V_{444}$ can be copied into a single area for B8 and B9 without separating every second row. Either way, the U plane (or V plane) of the auxiliary YUV 4:2:0 frame is constructed from the U plane (or V plane) of the YUV 4:4:4 frame, without mixing content from different original U and V planes. (In contrast, in the example of FIG. 9, the U plane (or V plane) of the auxiliary YUV 4:2:0 frame has a mixture of data from the U and V components of the YUV 4:4:4 frame. The upper half of the U plane (or V plane) of the auxiliary YUV 4:2:0 frame contains data from the original U plane, and the lower half contains data from the original V plane.)

The first frame (902) and second frame (903) of the YUV 4:2:0 format can be organized as separate frames (separated by the dark line in FIG. 9). Or, the first frame (902) and second frame (903) of the YUV 4:2:0 format can be organized as a single frame having a height of 2×H (ignoring the dark line in FIG. 9). Or, the first frame (902) and second frame (903) of the YUV 4:2:0 format can be organized as a single frame having a width of 2×W. Or, the first frame (902) and second frame (903) of the YUV 4:2:0 format can be organized as a single frame using any of the methods defined for frame_packing_arrangement_type in the H.264/AVC standard or the HEVC standard.

Figure 10:
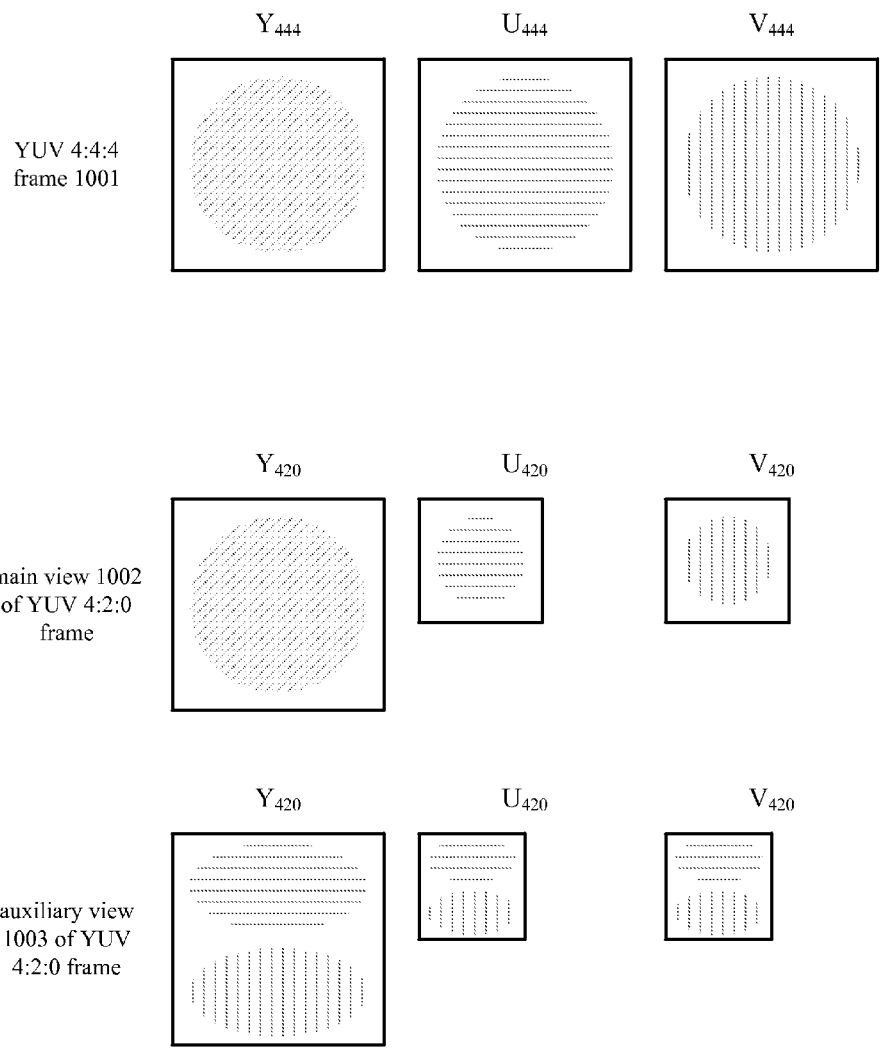
FIG. 10 is a diagram illustrating example frames packed according to the approach of FIG. 9.

FIG. 10 illustrates example frames packed according to the approach (900) of FIG. 9. FIG. 10 shows a YUV 4:4:4 frame (1001) that includes a $Y_{444}$ plane, $U_{444}$ plane, and $V_{444}$ plane.

After frame packing, the main view (1002) (first YUV 4:2:0 frame) is the YUV 4:2:0 equivalent of the original YUV 4:4:4 frame (1001). A decoding system can simply display a reconstructed version of the main view (1002) if YUV 4:4:4 is either not supported or considered not necessary.

The auxiliary view (1003) contains chroma information for the YUV 4:4:4 frame (1001). Even so, the auxiliary view (1003) fits the content model of a YUV 4:2:0 frame and is well suited for compression using a typical YUV 4:2:0 video encoder. Within the frame, the auxiliary view (1003) exhibits its geometric correspondence across its Y, U and V components. Between frames, the auxiliary views are expected to show motion that is highly correlated across Y, U and V components.

Figure 11:
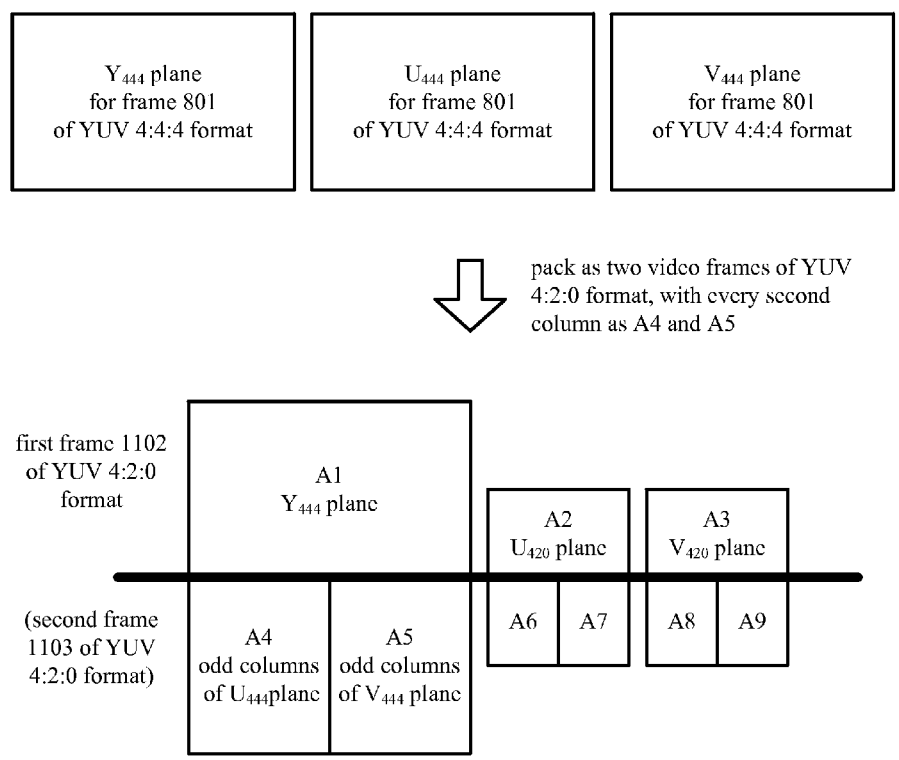
FIG. 11 is a diagram illustrating an example approach to frame packing in which every second column of chroma component planes of frames of a higher-resolution chroma sampling format is copied.

FIG. 11 illustrates another example approach (1100) to frame packing that is consistent with these design constraints. In this approach (1100), a YUV 4:4:4 frame (801) is packed into two YUV 4:2:0 frames (1102, 1103). Much like the approach (900) of FIG. 9, in the approach (1100) of FIG. 11, the first frame (1102) provides a "main view" in YUV 4:2:0 format—a lower chroma resolution version of the complete scene represented by the YUV 4:4:4 frame (801)—while the second frame (1103) provides an "auxiliary view" in YUV 4:2:0 format and contains remaining chroma information.

In FIG. 11, the areas A1 . . . A9 are different areas within the respective frames (1102, 1103) of YUV 4:2:0 format. The sample values of odd columns of the $U_{444}$ plane and $V_{444}$ plane of the YUV 4:4:4 frame (801) are assigned to the areas A4 and A5, and the sample values of even columns of the $U_{444}$ plane and $V_{444}$ plane of the YUV 4:4:4 frame (801) are distributed between the areas A2, A3 and A6 . . . A9. Specifically, sample values of the $Y_{444}$ plane, $U_{444}$ plane, and $V_{444}$ plane of the YUV 4:4:4 frame (801) map to the areas A1 . . . A9 as follows.

For area A1, $Y_{420}^{main}(x, y) = Y_{444}(x, y)$, where the range of (x, y) is [0, W−1]×[0, H−1].

For area A2, $U_{420}^{main}(x, y) = U_{444}(2x, 2y)$, where the range of (x, y) is $$\left[0, \frac{W}{2} - 1\right] \times \left[0, \frac{H}{2} - 1\right].$$

For area A3, $V_{420}^{main}(x, y) = V_{444}(2x, 2y)$, where the range of (x, y) is $$\left[0, \frac{W}{2} - 1\right] \times \left[0, \frac{H}{2} - 1\right].$$

For area A4, $Y_{420}^{aux}(x, y) = U_{444}(2x+1, y)$, where the range of (x, y) is $$\left[0, \frac{W}{2} - 1\right] \times [0, H - 1].$$

For area A5, $$Y_{420}^{aux}\left(\frac{W}{2} + x, y\right) = V_{444}(2x+1, y),$$

where the range of (x, y) is $$\left[0, \frac{W}{2} - 1\right] \times [0, H - 1].$$

For area A6, $U_{420}^{aux}(x, y)=U_{444}(4x, 2y+1)$, where the range of (x, y) is $$\left[0, \frac{W}{4} - 1\right] \times \left[0, \frac{H}{2} - 1\right].$$

For area A7, $$U_{420}^{aux}\left(\frac{W}{4} + x, y\right) = V_{444}(4x, 2y + 1),$$

where the range of (x, y) is $$\left[0, \frac{W}{4} - 1\right] \times \left[0, \frac{H}{2} - 1\right].$$

For area A8, $V_{420}^{aux}(x, y)=U_{444}(4x+2,2y+1)$, where the range of (x, y) is $$\left[0, \frac{W}{4} - 1\right] \times \left[0, \frac{H}{2} - 1\right].$$

For area A9, $$V_{420}^{aux}\left(\frac{W}{4} + x, y\right) = V_{444}(4x + 2, 2y + 1),$$

where the range of (x, y) is $$\left[0, \frac{W}{4} - 1\right] \times \left[0, \frac{H}{2} - 1\right].$$

Alternatively, the sample values of the $Y_{444}$ plane, $U_{444}$ plane, and $V_{444}$ plane of the YUV 4:4:4 frame (801) can be assigned to the areas A1 . . . A9 in a different way. For example, the sample values of even columns of the $U_{444}$ plane and $V_{444}$ plane of the YUV 4:4:4 frame (801) are assigned to the areas A4 and A5, and the sample values of odd columns of the $U_{444}$ plane and $V_{444}$ plane of the YUV 4:4:4 frame (801) are distributed between the areas A2, A3 and A6 . . . A9. Or, as another example, data from the original U plane of the YUV 4:4:4 frame can be arranged in the U plane of the auxiliary YUV 4:2:0 frame, and data from the original V plane of the YUV 4:4:4 frame can be arranged in the V plane of the auxiliary YUV 4:2:0 frame. In this example, compared to FIG. 11, the sample values from $V_{444}(4x, 2y+1)$ that are assigned to area A7 in the equations above are instead assigned to area A8, and the sample values from $U_{444}(4x+2, 2y+1)$ that are assigned to area A8 in the equations above are instead assigned to area A7. Or, the same sample values from $U_{444}$ can be copied into a single area for A6 and A7 without separating every second column, and the same sample values from $V_{444}$ can be copied into a single area for A8 and A9 without separating every second column. Either way, the U plane (or V plane) of the auxiliary YUV 4:2:0 frame is constructed from the U plane (or V plane) of the YUV 4:4:4 frame, without mixing content from different original U and V planes.

The first frame (1102) and second frame (1103) of the YUV 4:2:0 format can be organized as separate frames (separated by the dark line in FIG. 11). Or, the first frame (1102) and second frame (1103) of the YUV 4:2:0 format can be organized as a single frame having a height of 2×H (ignoring the dark line in FIG. 11). Or, the first frame (1102) and second frame (1103) of the YUV 4:2:0 format can be organized as a single frame having a width of 2×W. Or, the first frame (1102) and second frame (1103) of the YUV 4:2:0 format can be organized as a single frame using any of the methods defined for frame_packing_arrangement_type in the H.264/AVC standard or the HEVC standard.

Frame unpacking can simply mirror frame packing. Samples assigned to areas of with frames of YUV 4:2:0 format are assigned back to original locations in chroma components of frames of YUV 4:4:4 format. In one implementation, for example, during frame unpacking, samples in areas B2 . . . B9 of frames of YUV 4:2:0 format are assigned to reconstructed chroma components $U'_{444}$ and $V'_{444}$ of frame of YUV 4:4:4 format as shown in the following pseudocode.

```
for( x = 0; x < (W >> 1); x++ ) {
   for( y = 0; y < (H >> 1); y++ ) {
      U'444(2x, 2y + 1) = Y"420aux(2x, y)
      V'444(2x, 2y + 1) = Y"420aux(2x, (H >> 1) + y)
      U'444(2x + 1,2y + 1) = Y"420aux(2x + 1,y)
      V'444(2x + 1,2y + 1) = Y"420aux(2x + 1, (H >> 1) + y)
      if( y % 2 == 0 ) {
         U'444(2x + 1,2y) = U"420aux(x, y >> 1)
         V'444(2x + 1,2y) = U"420aux(x, (H >> 2) + (y >> 1))
      } else {
         U'444(2x + 1,2y) = V"420aux(x, y >> 1)
         V'444(2x + 1,2y) = V"420aux(x, (H >> 2) + (y >> 1))
      }
      U'444(2x, 2y) = U"420main(x, y)
      V'444(2x, 2y) = V"420main(x, y)
   }
}
``` where the " mark indicates reconstruction from (possibly lossy) coding.

B. Syntax and Semantics of Values for Signaling Frame Packing Information.

In example implementations, a frame packing arrangement SEI message is used to signal that two 4:2:0 frames include a packed 4:4:4 frame. Frame packing arrangement SEI messages are defined in the H.264/AVC standard as well as the HEVC standard, although such frame packing arrangement SEI messages have previously been used for a different purpose.

A frame packing arrangement SEI message was designed to send stereoscopic 3D video frames using a 2D video codec. In such a case, two 4:2:0 frames represent the left and right views of a stereoscopic 3D video scene. For the approaches described herein, the scope of the frame packing arrangement SEI message can be extended to instead support encoding/decoding of two 4:2:0 frames obtained from a single 4:4:4 frame, followed by frame unpacking to recover the 4:4:4 frame. The two 4:2:0 frames represent a main view and an auxiliary view. Both the main and auxiliary views (frames) are in a format that is an equivalent of a 4:2:0 format. The main view (frame) may be independently useful, while the auxiliary view (frame) is useful when interpreted appropriately together with the main view. Thus, these approaches can use the frame packing arrangement SEI message to effectively support encoding/decoding 4:4:4 frames using video codecs capable of coding/decoding 4:2:0 frames.

To this end, the SEI message is extended. For example, the semantics of the syntax element content_interpretation_type are extended as follows. In the relevant frame packing approaches, for a YUV 4:4:4 frame, there are two constituent YUV 4:2:0 frames—a first frame for a main view, and a second frame for an auxiliary view. The content_interpretation_type indicates the intended interpretation of the constituent frames as specified in the following table. The values 0, 1 and 2 are interpreted as in the H.264/AVC standard and HEVC standard. New values for content_interpretation_type are defined to indicate that the constituent frames should be interpreted as containing data from YUV 4:4:4 frames:

Value Interpretation

0   Unspecified relationship between the frame packed constituent frames.
1   Indicates that the two constituent frames form the left and right views of a stereo view scene, with frame 0 being associated with the left view and frame 1 being associated with the right view.
2   Indicates that the two constituent frames form the right and left views of a stereo view scene, with frame 0 being associated with the right view and frame 1 being associated with the left view.
3   Indicates that the two constituent frames form the main and auxiliary YUV 4:2:0 frames representing a YUV 4:4:4 frame, with frame 0 being associated with the main view and frame 1 being associated with the auxiliary view. Indicates that the chroma samples of frame 0 should be interpreted as unfiltered samples of the 4:4:4 frame (without anti-alias filtering).
4   Indicates that the two constituent frames form the main and auxiliary YUV 4:2:0 frames representing a YUV 4:4:4 frame, with frame 0 being associated with the main view and frame 1 being associated with the auxiliary view. Indicates that the chroma samples of frame 0 should be interpreted as having been anti-alias filtered prior to frame packing.
5   Indicates that the two constituent frames form the main and auxiliary YUV 4:2:0 frames representing a YUV 4:4:4 frame, with frame 1 being associated with the main view and frame 0 being associated with the auxiliary view. Indicates that the chroma samples of frame 1 should be interpreted as unfiltered samples of the 4:4:4 frame (without anti-alias filtering).
6   Indicates that the two constituent frames form the main and auxiliary YUV 4:2:0 frames representing a YUV 4:4:4 frame, with frame 1 being associated with the main view and frame 0 being associated with the auxiliary view. Indicates that the chroma samples of frame 1 should be interpreted as having been anti-alias filtered prior to frame packing.

Alternatively, different values for the syntax element content_interpretation_type are associated with the interpretations shown in the preceding table. Or, other and/or additional interpretations for content_interpretation_type can be used to support encoding/decoding of frames of a lower-resolution chroma sampling format obtained from one or more frames of a higher-resolution chroma sampling format by frame packing.

In addition, for the purpose of simplification, one or more of the following constraints may also be imposed for other syntax elements of a frame packing arrangement SEI message. When content_interpretation_type has a value between 3 and 6 (that is, for cases involving frame packing of YUV 4:4:4 frames into YUV 4:2:0 frames), the values of the syntax elements quincunx_sampling_flag, spatial_flipping_flag, frame0_grid_position_x, frame0_grid_position_y, frame1_grid_position_x, and frame1_grid_position_y shall be 0. Furthermore, when content_interpretation_type is equal to 3 or 5 (indicating absence of filtering in pre-processing), chroma_loc_info_present_flag shall be 1, and the values of chroma_sample_loc_type_top_field and chroma_sample_loc_type_bottom_field shall be 2.

In the H.264/AVC standard (and in the HEVC standard), the syntax element frame_packing_arrangment_type indicates how two constituent frames of a stereoscopic view are arranged. For example, frame_packing_arrangement_type==3 indicates side-by-side packing of the two constituent frames, frame_packing_arrangement_type==4 indicates top-bottom packing of the two constituent frames, and frame_packing_arrangement_type==5 indicates temporal interleaving of the two constituent frames. The syntax element frame_packing_arrangement_type can be used similarly in conjunction with values of content_interpretation_type that indicate packing of frames of a higher-resolution chroma sampling format. For example, frame_packing_arrangement_type==3 can indicate side-by-side packing of main and auxiliary frames, frame_packing_arrangement_type==4 can indicate top-bottom packing of main and auxiliary frames, and frame_packing_arrangement_type==5 can indicate temporal interleaving of main and auxiliary frames. Or, frame packing arrangement metadata is signaled in some other way. Alternatively, instead of extending the semantics of the content_interpretation_type syntax element to indicate packing of frames of a higher-resolution chroma sampling format, the semantics of frame_packing_arrangement_type can be extended to indicate packing of frames of a higher-resolution chroma sampling format. For example, frame packing arrangement metadata (such as values of frame_packing_arrangement_type higher than 5) can indicate whether frame packing/unpacking is used or not used, whether filtering or other pre-processing operations were used or not used (and hence whether corresponding post-processing filtering or other post-processing operations should be used or not used), the type of post-processing operations to perform, or other information about frame packing/unpacking, in addition to indicating how the main and auxiliary views are arranged.

In these examples, the frame packing arrangement SEI message informs a decoder that the decoded pictures contain main and auxiliary views of a 4:4:4 frame as the constituent frames of the frame packing arrangement. This information can be used to process the main and auxiliary views appropriately for display or other purposes. For example, when the system at the decoding end desires the video in 4:4:4 format and is capable of reconstructing the 4:4:4 frames from the main and auxiliary views, the system may do so, and the output format will be 4:4:4. Otherwise, only the main view is given as output, and the output format will then be 4:2:0.

C. Pre-Processing and Post-Processing Operations.

Simple sub-sampling of the chroma sample values of frames of a higher-resolution chroma sampling format can introduce aliasing artifacts in the downsampled chroma sample values. To mitigate aliasing, frame packing can include pre-processing operations to filter chroma sample values. Such filtering can be termed anti-alias filtering. Corresponding frame unpacking can then include post-processing operations to compensate for the pre-processing filtering of the chroma sample values. For example, with reference to the preceding table, when the content_interpretation_type is 4 or 6, pre-processing operations can be used to filter the chroma sample values during frame packing, and frame unpacking can include corresponding post-processing operations.

There are various reasons for pre-processing and post-processing adapted to frame packing/unpacking.

For example, pre-processing can help improve quality when only the YUV 4:2:0 frame representing the main view is used for display. This can permit a decoder to ignore the YUV 4:2:0 frame representing the auxiliary view without running the risk of aliasing artifacts caused by simple sub-sampling of chroma information. Without pre-processing (when the chroma signal for the YUV 4:2:0 frame representing the main view is obtained by direct sub-sampling of the chroma signal from the YUV 4:4:4 frame), aliasing artifacts can be seen on some content, for example, ClearType text content, when only the main view is used to generate output.

As another example, pre-processing and post-processing can help maintain/enforce consistency and smoothness of the compressed chroma signal in the YUV 4:4:4 domain. When frame packing is used to pack a YUV 4:4:4 frame into two YUV 4:2:0 frames, the chroma signal is split into multiple areas, and each area may get compressed differently (e.g., with a different level of quantization) depending on its location. Because of this, when the chroma signal is assembled again by interleaving the data from multiple areas, artificial discontinuities and high-frequency noise may be introduced. A post-processing operation can help smooth the differences caused in these areas due to compression.

As another example, pre-processing can help enhance the compression of the YUV 4:2:0 frame representing the auxiliary view, which contains the remaining chroma information.

In some example implementations, the pre-processing operations and post-processing operations are limited such that they affect only the chroma signal that is part of the YUV 4:2:0 frame representing the main view. That is, the filtered sample values are part of the chroma components of the main view.

Additionally, for frame packing/unpacking in conjunction with AVC coding/decoding or HEVC coding/decoding, pre-processing operations and post-processing operations can be based on the chroma sample location type (indicating chroma sample grid alignment with luma sample grid). The chroma sample location type is determined from chroma_sample_loc_type_top_field and chroma_sample_loc_type_bottom_field syntax elements signaled as part of the compressed bitstream. (These two elements would ordinarily have equal values for progressive-scan source content.) For a given chroma sample location type, if the chroma sample aligns with the luma samples for a particular direction (horizontal or vertical), then an odd-tap symmetric filter (such as [1 2 1]/4, or [0.25 0.5 0.25], along with a rounding operation) is used to filter chroma in that direction. On the other hand, if the chroma sample does not align with the luma samples for a particular direction (horizontal or vertical), and the chroma sample grid positions are centered between the luma sample positions for a particular direction (horizontal/vertical), then an even-tap symmetric filter (typically [1 1]/2, or [0.5 0.5], along with a rounding operation) is used to filter chroma in that direction. Another possible filter choice for the latter case is [1 3 3 1]/8, or [0.125 0.375 0.375 0.125], along with a rounding operation. The choice of post-processing operation is usually made such that the post-processing operation compensates for the pre-processing operation. In some cases post-processing directly inverts pre-processing, while in other cases post-processing only approximately inverts pre-processing, as explained below.

In implementations of frame packing/unpacking in conjunction with AVC coding/decoding or HEVC coding/decoding, if the chroma sample location type is 1 for chroma_sample_loc_type_top_field and chroma_sample_loc_type_bottom_field syntax elements, the chroma sample does not align with luma samples in either horizontal or vertical direction, and hence the filter [0.5 0.5] is applied in both the horizontal and vertical directions for the pre-processing operation. In such a case, for the approach (900) illustrated with reference to FIG. 9, the equations for deriving the sample values areas B2 and B3 are as follows.

For area B2: $U_{420}^{main\_filt}(x, y) = [U_{444}(2x, 2y) + U_{444}(2x+1, 2y) + U_{444}(2x, 2y+1) + U_{444}(2x+1, 2y+1) + 2]/4$, and For area B3: $V_{420}^{main\_filt}(x, y) = [V_{444}(2x, 2y) + V_{444}(2x+1, 2y) + V_{444}(2x, 2y+1) + V_{444}(2x+1, 2y+1) + 2]/4$, where the range of (x, y) is $$\left[0, \frac{W}{2} - 1\right] \times \left[0, \frac{H}{2} - 1\right].$$

for both areas.

Due to this filtering, the sample values at positions $U_{444}(2x, 2y)$ and $V_{444}(2x, 2y)$ from the YUV 4:4:4 frame are not represented directly in the main view (902); instead, filtered sample values ($U_{420}^{main\_filt}(x, y)$ and $V_{420}^{main\_filt}(x, y)$) are at positions in the main view (902). The sample values at $U_{444}(2x+1, 2y)$, $U_{444}(2x, 2y+1)$, $U_{444}(2x+1, 2y+1)$, $V_{444}(2x+1, 2y)$, $V_{444}(2x, 2y+1)$ and $V_{444}(2x+1, 2y+1)$ from the YUV 4:4:4 frame are still represented directly in the auxiliary view (903) among the areas B4 . . . B9.

In corresponding filtering as part of post-processing operations when frames in YUV 4:4:4 format are to be output, the sample values for position $U_{444}(2x, 2y)$ and $V_{444}(2x, 2y)$ of the YUV 4:4:4 frame can be calculated as $U'_{444}(2x, 2y)$ and $V'_{444}(2x, 2y)$, from values in the packed frame, as follows:

$U'_{444}(2x, 2y) = (1+3\alpha) * U''_{420}{}^{main\_filt}(x, y) - \alpha * [U''_{444}(2x+1, 2y) + U''_{444}(2x, 2y+1) + U''_{444}(2x+1, 2y+1)]$, and $V'_{444}(2x, 2y) = (1+3\alpha) * V''_{420}{}^{main\_filt}(x, y) - \alpha * [V''_{444}(2x+1, 2y) + V''_{444}(2x, 2y+1) + V''_{444}(2x+1, 2y+1)]$.

where the range of (x, y) is $$\left[0, \frac{W}{2} - 1\right] \times \left[0, \frac{H}{2} - 1\right].$$

α is a weighting factor that depends on implementation, and the " mark indicates reconstruction from (possibly lossy) coding. With chroma sample grid positions centered between luma sample positions both horizontally and vertically, with the suggested anti-alias filter of [0.5 0.5], the value α=1 would perfectly reconstruct the input values in the absence of quantization error and rounding error, directly inverting the filtering performed in pre-processing. For other values of α, filtering during post-processing only approximately inverts the filtering performing in pre-processing. When considering quantization error, using a somewhat smaller value of α (e.g., α=0.5) may be advisable in order to reduce perceptible artifacts. In general, α should be in the range from 0.0 to 1.0, and α should be smaller when the quantization step size is larger. Using a high value of α may exacerbate artifacts introduced due to lossy compression.

Or, different weights can be assigned for different sample positions. The sample values for position $U_{444}(2x, 2y)$ and $V_{444}(2x, 2y)$ of the YUV 4:4:4 frame can be calculated as $U'_{444}(2x, 2y)$ and $V'_{444}(2x, 2y)$, from values in the packed frame, as follows:

$U'_{444}(2x, 2y)=(1+\alpha+\beta+\gamma)*U''^{main\_filt}_{420}(x, y)-\alpha*U''_{444}(2x+1,2y)-\beta* U''_{444}(2x, 2y+1)-\gamma* U''_{444}(2x+1,2y+1)$, $V'_{444}(2x, 2y)=(1+\alpha+\beta+\gamma)*V''^{main\_filt}_{420}(x, y)-\alpha*V''_{444}(2x+1,2y)-\beta* V''_{444}(2x, 2y+1)-\gamma* V''_{444}(2x+1,2y+1)$, where the range of (x, y) is $$\left[0, \frac{W}{2}-1\right] \times \left[0, \frac{H}{2}-1\right],$$

α, β and γ are weighting factors that depend on implementation, and the " mark indicates reconstruction from (possibly lossy) coding. With chroma sample grid positions centered between luma sample positions both horizontally and vertically, with the suggested anti-alias filter of [0.5 0.5], the values α=β=γ=1 would perfectly reconstruct the input values in the absence of quantization error and rounding error, directly inverting the filtering performed in pre-processing. For other values of α, β and γ, filtering during post-processing only approximately inverts the filtering performing in pre-processing. When considering quantization error, using somewhat smaller values of α, β and γ (e.g., α=β=γ=0.5) may be advisable in order to reduce perceptible artifacts. In general, α, β and γ should be in the range from 0.0 to 1.0, and α, β and γ should be smaller when the quantization step size is larger. Using high values of α, β and γ may exacerbate artifacts introduced due to lossy compression. The values of α, β and γ can be designed for conditional optimality using cross-correlation analysis.

When α=β=γ=1, the sample values for position $U_{444}(2x, 2y)$ and $V_{444}(2x, 2y)$ of the YUV 4:4:4 frame can simply be calculated as $U'_{444}(2x, 2y)$ and $V'_{444}(2x, 2y)$, from values in the packed frame, as follows:

$U'_{444}(2x, 2y)=4*U''^{main\_filt}_{420}(x, y)-U''_{444}(2x+1,2y)-U''_{444}(2x, 2y+1)-U''_{444}(2x+1,2y+1)$, and $V'_{444}(2x, 2y)=4*V''^{main\_filt}_{420}(x, y)-V''_{444}(2x+1,2y)-V''_{444}(2x, 2y+1)-V''_{444}(2x+1,2y+1)$, where the range of (x, y) is $$\left[0, \frac{W}{2}-1\right] \times \left[0, \frac{H}{2}-1\right].$$

For example, during pre-processing, the sample values 29, 15, 7, and 18 for locations (2x, 2y), (2x+1, 2y), (2x, 2y+1) and (2x+1, 2y+1) are filtered to produce a sample value 17.25, which is rounded to 17. The value filtered sample value of 17 is used in place of the original sample value of 29. During post-processing, the sample value for the position (2x, 2y) is reconstructed to be 68−15−7−18=28. The difference between the original sample value (29) and reconstructed sample value (28) shows loss of precision due to the filtering for the pre-processing operation.

Alternatively, a device can selectively skip filtering operations during post-processing, even when filtering was performed during pre-processing. For example, a device can skip filtering during post-processing to reduce the computational load of decoding and playback.

Alternatively, the pre-processing operations and post-processing operations are not limited to the chroma signal of the 4:4:4 frame that is part of the 4:2:0 frame representing the main view (for example, areas B2 and B3 for the frame 902 represented in FIG. 9). Instead, the pre-processing operations and post-processing operations are also performed for the chroma signal of the 4:4:4 frame that is part of the 4:2:0 frame representing the auxiliary view (for example, areas B4 to B9 of the frame 903 represented in FIG. 9). Such pre-processing and post-processing operations (for the chroma signal of the 4:4:4 frame that is part of the 4:2:0 frame representing the auxiliary view) can use different filtering operations than the pre-processing and post-processing of the chroma signal of the 4:4:4 frame that is made part of the 4:2:0 frame representing the main view.

In the foregoing examples of pre-processing operations and post-processing operations, an averaging filtering is used during pre-processing and corresponding filtering is used during post-processing. Alternatively, the pre-processing operations and post-processing operations can implement a transform/inverse transform pair. For example, the transform/inverse transform pair can be one of the class of wavelet transformations, lifting transformations and other transformations. Specific transforms can also be designed depending on use case scenarios, so as to satisfy the different design reasons mentioned above for the use of pre-processing operations and post-processing operations in the context of packing 4:4:4 frames. Or, the pre-processing and post-processing can use other filter structures, with other filter regions of support, or use filtering that is adaptive with respect to content and/or fidelity (e.g., adaptive with respect to the quantization step sizes used for the encoding).

In some example implementations, the representation and/or compression of the frame-packed 4:2:0 content can use a higher sample bit depth than the original sample bit depth of the 4:4:4 content. For example, the sample bit depth of the 4:4:4 frames is 8 bits per sample, and the sample bit depth of the frame-packed 4:2:0 frames is 10 bits per sample. This can help reduce precision loss during the application of pre-processing operations and post-processing operations. Or, this can help achieve higher level of fidelity when 4:2:0 frames are encoded using lossy compression. For example, if the 4:4:4 content has a sample bit depth of 8 bits per sample, and the frame-packed 4:2:0 content has a sample bit depth of 10 bits per sample, the bit depth of 10 bits per sample can be maintained in all or most internal modules of the encoder and decoder. The sample bit depth can be reduced to 8 bits per sample, if necessary, after unpacking the content to 4:4:4 format at the receiving end. More generally, the sample values of frames of the higher-resolution chroma sampling format can have a first bit depth (such as 8, 10, 12 or 16 bits per sample), while the sample values of frames of the lower-resolution chroma sampling format (following frame packing) have a second bit depth higher than the first bit depth.

D. Alternatives for YUV 4:2:2 Video.

In many of the foregoing examples, YUV 4:4:4 frames are packed into YUV 4:2:0 frames for encoding and decoding. FIG. 11, the approach (1100) can be used as is, except that the areas A4 and A5 will not have data.

In example implementations, new values for content_interpretation_type are defined to signal the packing of YUV 4:2:2 frames into the constituent YUV 4:2:0 frames, as shown in the following table.

| Value | Interpretation |
|---|---|
| 0 | Unspecified relationship between the frame packed constituent frames. |
| 1 | Indicates that the two constituent frames form the left and right views of a stereo view scene, with frame 0 being associated with the left view and frame 1 being associated with the right view. |
| 2 | Indicates that the two constituent frames form the right and left views of a stereo view scene, with frame 0 being associated with the right view and frame 1 being associated with the left view. |
| ... | ... |
| 7 | Indicates that the two constituent frames form the main and auxiliary YUV 4:2:0 frames representing a YUV 4:2:2 frame, with frame 0 being associated with the main view and frame 1 being associated with the auxiliary view. Indicates that the chroma samples of frame 0 should be interpreted as unfiltered samples of the 4:2:2 frame (without anti-alias filtering). |
| 8 | Indicates that the two constituent frames form the main and auxiliary YUV 4:2:0 frames representing a YUV 4:2:2 frame, with frame 0 being associated with the main view and frame 1 being associated with the auxiliary view. Indicates that the chroma samples of frame 0 should be interpreted as having been anti-alias filtered prior to frame packing. |
| 9 | Indicates that the two constituent frames form the main and auxiliary YUV 4:2:0 frames representing a YUV 4:2:2 frame, with frame 1 being associated with the main view and frame 0 being associated with the auxiliary view. Indicates that the chroma samples of frame 1 should be interpreted as unfiltered samples of the 4:2:2 frame (without anti-alias filtering). |
| 10 | Indicates that the two constituent frames form the main and auxiliary YUV 4:2:0 frames representing a YUV 4:2:2 frame, with frame 1 being associated with the main view and frame 0 being associated with the auxiliary view. Indicates that the chroma samples of frame 1 should be interpreted as having been anti-alias filtered prior to frame packing. |

In other examples, YUV 4:2:2 frames are packed into YUV 4:2:0 frames for encoding and decoding. A typical 4:2:2 frame contains 8 sample values for every 4 pixel positions, while a 4:2:0 frame contains only 6 sample values for every 4 pixel positions. So, the sample values contained in a 4:2:2 frame can be packed into 4/3 4:2:0 frames. That is, when packed efficiently, three 4:2:2 frames can be packed into four 4:2:0 frames.

In one approach, the frame packing for 4:2:2 frames is done in a simple manner similar to the simple approach (800) illustrated in FIG. 8 for 4:4:4 to 4:2:0 frame packing.

In other approaches, a YUV 4:2:2 frame is packed into YUV 4:2:0 frames while maintaining geometric correspondence for chroma information of the YUV 4:2:2 frame. The resulting YUV 4:2:0 frames with good geometric correspondence among their Y, U and V components can be compressed better because they fit the model expected by a typical encoder adapted to encoded YUV 4:2:0 frames. At the same time, the packing can be done such that a YUV 4:2:0 frame represents the complete scene being represented by YUV 4:2:2 frame, albeit with color components at a lower resolution.

These design constraints can be satisfied while packing a YUV 4:2:2 into two YUV 4:2:0 frames (main view and auxiliary view). The auxiliary view will have "empty" areas, but these areas can be filled using a fixed value or by replicating chroma values. Or, the empty areas can be used to indicate other information such as depth of a scene. For example, for the packing approach (900) described with reference to FIG. 9, the approach (900) can be used as is, except that the areas B4 and B5 will not have data. Or, for the packing approach (1100) described with reference to Alternatively, different values for the syntax element content_interpretation_type are associated with the interpretations shown in the preceding table. Or, other and/or additional interpretations for content_interpretation_type can be used to support encoding/decoding of frames of a lower-resolution chroma sampling format obtained from one or more frames of a higher-resolution chroma sampling format by frame packing.

E. Other Chroma Sampling Formats.

Many of the examples described herein involve variations of YUV color spaces such as Y'UV, YIQ, Y'IQ, YdbDr, YCbCr, YCoCg, etc. in sampling ratios such as 4:4:4, 4:2:2, 4:2:0, etc., as the chroma sampling formats. Alternatively, the described approaches can be used for color spaces such as RGB, GBR, etc. in sampling ratios such as 4:4:4, 4:2:2, 4:2:0, etc., as the chroma sampling formats. For example, a device can pack frames of a higher-resolution non-YUV chroma sampling format (such as RGB 4:4:4 or GBR 4:4:4) into frames of a lower resolution format (such as a 4:2:0 format), which may then be encoded. In the encoding, the nominally luma component and nominally chroma components represent sample values of the non-YUV components (rather than approximate brightness and color-difference values). In corresponding unpacking, a device unpacks frames of the lower resolution format (such as a 4:2:0 format) into frames of the higher-resolution non-YUV chroma sampling format (such as RGB 4:4:4 or GBR 4:4:4).

Also, the described approaches can be used for frame packing of video content of a 4:4:4 format, 4:2:2 format or 4:2:0 format into a 4:0:0 format, which is typically used for gray scale or monochrome video content. The chroma information from a frame of the 4:4:4 format, 4:2:2 format or 4:2:0 format can be packed into the primary component of one or more additional or auxiliary frames of 4:0:0 format.

F. Generalized Techniques for Frame Packing/Unpacking.

Figure 12:
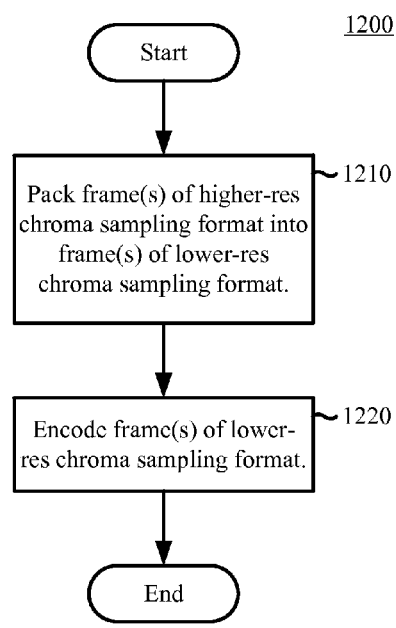
FIG. 12 is a flow chart illustrating a generalized technique for frame packing for frames of a higher-resolution chroma sampling format.

FIG. 12 shows a generalized technique (1200) for frame packing. A computing device that implements a frame packer, for example, as described with reference to FIG. 4, can perform the technique (1200).

The device packs (1210) one or more frames of a higher-resolution chroma sampling format into one or more frames of a lower-resolution chroma sampling format. For example, the device packs frame(s) of 4:4:4 format (e.g., YUV 4:4:4 format) into frame(s) of 4:2:0 format (e.g., YUV 4:2:0 format). Or, the device packs frame(s) of 4:2:2 format (e.g., YUV 4:2:2 format) into frame(s) of 4:2:0 format (e.g., YUV 4:2:0 format). Or, the device packs frame(s) of 4:4:4 format (e.g., YUV 4:4:4 format) into frame(s) of 4:2:2 format (e.g., YUV 4:2:2 format).

For YUV formats, the device can perform the frame packing (1210) so as to maintain geometric correspondence between adjacent sample values of chroma components of the frame(s) of the higher-resolution chroma sampling format after the packing. For example, such sample values are maintained as adjacent samples and/or collocated portions of luma and chroma components of the frame(s) of the lower-resolution chroma sampling format. Later encoding can exploit such geometric correspondence.

In some frame packing approaches, the device can embed a lower chroma resolution version of the frame(s) of the higher-resolution chroma sampling format as part of the frame(s) of the lower-resolution chroma sampling format. Thus, part of the frame(s) of the lower-resolution chroma sampling format represents a lower chroma resolution version of the frame(s) of the higher-resolution chroma sampling format. The rest of the frame(s) of the lower-resolution chroma sampling format represents remaining chroma information from the frame(s) of the higher-resolution chroma sampling format. In other frame packing approaches, according to spatial partitioning of the frame(s) of the higher-resolution chroma sampling format, the device assigns sample values of chroma components of the frame(s) of the higher-resolution chroma sampling format to luma and chroma components of the frame(s) of the lower-resolution chroma sampling format.

During the frame packing, the sample values of chroma components of the frame(s) of the higher-resolution chroma sampling format can be filtered, and filtered sample values are assigned to parts of chroma components of the frame(s) of the lower-resolution chroma sampling format. In some implementations, the sample values of the chroma components of the frame(s) of the higher-resolution chroma sampling format have a lower bit depth (e.g., 8 bits per sample), and the filtered sample values have a higher bit depth (e.g., 10 bits per sample) for encoding at the higher bit depth.

The device can then encode (1220) the frame(s) of the lower-resolution chroma sampling format. Alternatively, a different device performs the encoding (1220). The device(s) can repeat the technique (1200) on a frame-by-frame basis or other basis.

The device can signal metadata about frame packing/unpacking. For example, the device signals metadata that indicates whether frame packing/unpacking is used or not used. Or, the device signals an indication that the sample values of the chroma components of the frame(s) of the higher-resolution chroma sampling format have been filtered during the frame packing, and should be filtered as part of post-processing. The metadata about frame packing/unpacking can be signaled as part of a supplemental enhancement information message or as some other type of metadata.

Figure 13:
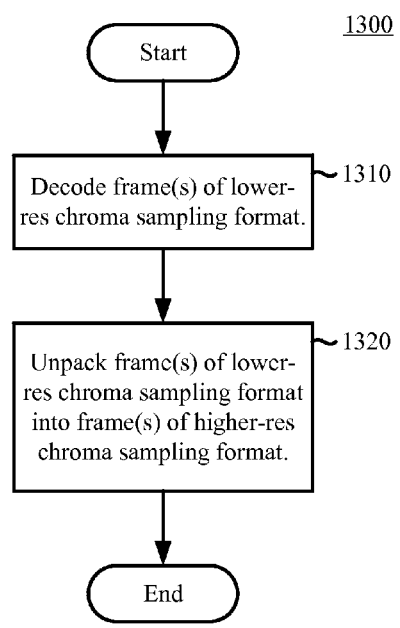
FIG. 13 is a flow chart illustrating a generalized technique for frame unpacking for frames of a higher-resolution chroma sampling format.

FIG. 13 shows a generalized technique (1300) for frame unpacking. A computing device that implements a frame unpacker, for example, as described with reference to FIG. 5, can perform the technique (1300).

Before the frame unpacking itself, the device can decode (1310) the frame(s) of a lower-resolution chroma sampling format. Alternatively, a different device performs the decoding (1310).

The device unpacks (1320) one or more frames of the lower-resolution chroma sampling format into one or more frames of a higher-resolution chroma sampling format. For example, the device unpacks frame(s) of 4:2:0 format (e.g., YUV 4:2:0 format) into frame(s) of 4:4:4 format (e.g., YUV 4:4:4 format). Or, the device unpacks frame(s) of 4:2:0 format (e.g., YUV 4:2:0 format) into frame(s) of 4:2:2 format (e.g., YUV 4:2:2 format). Or, the device unpacks frame(s) of 4:2:2 format (e.g., YUV 4:2:2 format) into frame(s) of 4:4:4 format (e.g., YUV 4:4:4 format).

When a lower chroma resolution version of the frame(s) of the higher-resolution chroma sampling format is embedded as part of the frame(s) of the lower-resolution chroma sampling format, the device has options for display. The part of the frame(s) of the lower-resolution chroma sampling format that represents a lower chroma resolution version of the frame(s) of the higher-resolution chroma sampling format can be reconstructed for output and display. The rest of the frame(s) of the lower-resolution chroma sampling format represents remaining chroma information from the frame(s) of the higher-resolution chroma sampling format, and can be used as part of frame unpacking. In other frame unpacking approaches, to reverse spatial partitioning of the frame(s) of the higher-resolution chroma sampling format, the device assigns sample values of luma and chroma components of the frame(s) of the lower-resolution chroma sampling format to chroma components of the frame(s) of the higher-resolution chroma sampling format.

During the frame unpacking, the sample values of chroma components of the frame(s) of the higher-resolution chroma sampling format can be filtered as part of post-processing. In some implementations, at least some sample values of the chroma components of the frame(s) of the higher-resolution chroma sampling format have a higher bit depth (e.g., 10 bits per sample) before the post-processing filtering, and such sample values have a lower bit depth (e.g., 8 bits per sample) after the post-processing filtering.

The device can also receive metadata about frame packing/unpacking. For example, the device receives metadata that indicates whether frame packing/unpacking is used or not used. Or, the device receives an indication that the sample values of the chroma components of the frame(s) of the higher-resolution chroma sampling format have been filtered during the frame packing, and should be filtered as part of post-processing. The metadata about frame packing/unpacking can be signaled as part of a supplemental enhancement information message or as some other type of metadata.

The device(s) can repeat the technique (1300) on a frame-by-frame basis or other basis.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. A method comprising:
receiving one or more frames of a higher-resolution chroma sampling format, the one or more frames of the higher-resolution chroma sampling format including sample values of chroma components and sample values of luma components; and
packing the one or more frames of the higher-resolution chroma sampling format into one or more frames of a lower-resolution chroma sampling format, wherein the lower-resolution chroma sampling format has a lower chroma resolution than the higher-resolution chroma sampling format, and wherein the packing includes assigning some of the sample values of the chroma components of the one or more frames in the higher-resolution chroma sampling format to sample values of a luma component of one of the one or more frames of the lower-resolution chroma sampling format.

2. The method of claim 1 further comprising, after the packing:
encoding the one or more frames of the lower-resolution chroma sampling format.

3. The method of claim 2 wherein the packing maintains geometric correspondence between adjacent sample values of the chroma components of the one or more frames of the higher-resolution chroma sampling format as adjacent samples and/or collocated portions of luma and chroma components of the one or more frames of the lower-resolution chroma sampling format, and wherein the encoding exploits the geometric correspondence.

4. The method of claim 3 wherein the encoding exploits the geometric correspondence (a) in encoding operations that include one or more of derivation of motion vectors and derivation of prediction modes, and/or (b) to guide encoding decisions that include one or more of motion estimation, selection of quantization parameters and selection of prediction modes.

5. The method of claim 1 wherein first parts of the one or more frames of the lower-resolution chroma sampling format represent a lower chroma resolution version of the one or more frames of the higher-resolution chroma sampling format, and wherein second parts of the one or more frames of the lower-resolution chroma sampling format, the second parts including the luma component of one of the one or more frames of the lower-resolution chroma sampling format, represent remaining chroma information from the one or more frames of the higher-resolution chroma sampling format.

6. The method of claim 1 further comprising:
signaling metadata that indicates that first parts of the one or more frames of the lower-resolution chroma sampling format represent a lower chroma resolution version of the one or more frames of the higher-resolution chroma sampling format, and indicates that second parts of the one or more frames of the lower-resolution chroma sampling format, the second parts including the luma component of one of the one or more frames of the lower-resolution chroma sampling format, represent remaining chroma information from the one or more frames of the higher-resolution chroma sampling format.

7. The method of claim 1 wherein the packing is consistent with plural design constraints, the plural design constraints including:
maintaining geometric correspondence among the sample values of the chroma components of the one or more frames of the higher-resolution chroma sampling format after the packing; and
embedding a lower chroma resolution version of the one or more frames of the higher-resolution chroma sampling format as part of the one or more frames of the lower-resolution chroma sampling format.

8. The method of claim 1 wherein the luma component of one of the one or more frames of the lower-resolution chroma sampling format is a luma component of an auxiliary view among the one or more frames of the lower-resolution chroma sampling format, and wherein the packing includes, for the chroma components of the one or more frames of the higher-resolution chroma sampling format:
assigning sample values corresponding to every second row or column of the chroma components of the one or more frames of the higher-resolution chroma sampling format to sample values of the luma component of the auxiliary view among the one or more frames of the lower-resolution chroma sampling format;
assigning every second sample value corresponding to other rows or columns of the chroma components of the one or more frames of the higher-resolution chroma sampling format to sample values of chroma components of a main view among the one or more frames of the lower-resolution chroma sampling format; and
assigning other sample values corresponding to the other rows or columns of the chroma components of the one or more frames of the higher-resolution chroma sampling format to sample values of chroma components of the auxiliary view among the one or more frames of the lower-resolution chroma sampling format.

9. The method of claim 1 wherein the packing includes:
anti-alias filtering the sample values of the chroma components of the one or more frames of the higher-resolution chroma sampling format; and
assigning the filtered sample values to sample values of chroma components of a main view among the one or more frames of the lower-resolution chroma sampling format.

10. The method of claim 1 wherein the sample values of the one or more frames of the higher-resolution chroma sampling format have a first bit depth, and wherein sample values of the one or more frames of the lower-resolution chroma sampling format have a second bit depth higher than the first bit depth.

11. The method of claim 1 further comprising:
signaling an indication of whether the sample values of the chroma components of the one or more frames of the higher-resolution chroma sampling format have been filtered as part of the packing.

12. A computing device comprising:
one or more processing units;
volatile memory; and
non-volatile memory and/or storage, the non-volatile memory and/or storage having stored therein computer-executable instructions for causing the computing device, when programmed thereby, to perform operations to reconstruct frames of a higher-resolution chroma sampling format, the operations comprising:
receiving one or more frames of a lower-resolution chroma sampling format, wherein the lower-resolution chroma sampling format has a lower chroma resolution than the higher-resolution chroma sampling format; and unpacking the one or more frames of the lower-resolution chroma sampling format into one or more frames of the higher-resolution chroma sampling format, the one or more frames of the higher-resolution chroma sampling format including sample values of chroma components and sample values of luma components, wherein the unpacking includes assigning sample values of a luma component of one of the one or more frames of the lower-resolution chroma sampling format to some of the sample values of the chroma components of the one or more frames in the higher-resolution chroma sampling format.

13. The computing device of claim 12 wherein the operations further comprise, before the receiving and the unpacking:
decoding the one or more frames of the lower-resolution chroma sampling format.

14. The computing device of claim 12 wherein first parts of the one or more frames of the lower-resolution chroma sampling format represent a lower chroma resolution version of the one or more frames of the higher-resolution chroma sampling format, and wherein second parts of the one or more frames of the lower-resolution chroma sampling format, the second parts including the luma component of one of the one or more frames of the lower-resolution chroma sampling format, represent remaining chroma information from the one or more frames of the higher-resolution chroma sampling format.

15. The computing device of claim 12 wherein the operations further comprise:
receiving metadata that indicates first parts of the one or more frames of the lower-resolution chroma sampling format represent a lower chroma resolution version of the one or more frames of the higher-resolution chroma sampling format, and indicates second parts of the one or more frames of the lower-resolution chroma sampling format, the second parts including the luma component of one of the one or more frames of the lower-resolution chroma sampling format, represent remaining chroma information from the one or more frames of the higher-resolution chroma sampling format.

16. The computing device of claim 12 wherein the luma component of one of the one or more frames of the lower-resolution chroma sampling format is a luma component of an auxiliary view among the one or more frames of the lower-resolution chroma sampling format, and wherein the unpacking includes, for the chroma components of the one or more frames of the higher-resolution chroma sampling format:
assigning the sample values corresponding to the luma component of the auxiliary view among the one or more frames of the lower-resolution chroma sampling format to sample values of every second row or column of the chroma components of the one or more frames of the higher-resolution chroma sampling format;
assigning sample values corresponding to chroma components of a main view among the one or more frames of the lower-resolution chroma sampling format to sample values at every second position of other rows or columns of the chroma components of the one or more frames of the higher-resolution chroma sampling format; and
assigning sample values corresponding to chroma components of the auxiliary view among the one or more frames of the lower-resolution chroma sampling format to sample values at other positions of the other rows or columns of the chroma components of the one or more frames of the higher-resolution chroma sampling format.

17. The computing device of claim 12 wherein the unpacking includes:
filtering the sample values of the chroma components of the one or more frames of the higher-resolution chroma sampling format.

18. The computing device of claim 12 wherein the sample values of the one or more frames of the higher-resolution chroma sampling format have a first bit depth, and wherein sample values of the one or more frames of the lower-resolution chroma sampling format have a second bit depth higher than the first bit depth.

19. The computing device of claim 12 wherein the operations further comprise:
receiving an indication of whether the sample values of chroma components of the one or more frames of the higher-resolution chroma sampling format have been filtered as part of packing.

20. A computing device comprising a processor and memory, wherein the computing device implements:
a video encoder adapted to encode and/or video decoder adapted to decode frames of a YUV 4:2:0 format; and
a module for processing a supplemental enhancement information message that indicates (a) first parts of one or more frames of the YUV 4:2:0 format represent a lower chroma resolution version of one or more frames of a YUV 4:4:4 format, (b) second parts of the one or more frames of the YUV 4:2:0 format represent remaining chroma information from the one or more frames of the YUV 4:4:4 format, and (c) whether sample values of chroma components of the one or more frames of the YUV 4:4:4 format have been filtered as part of packing into the one or more frames of the YUV 4:2:0 format, some of the sample values of the chroma components of the one or more frames of the YUV 4:4:4 format being assigned to sample values of a luma component among the second parts of the one or more frames of the YUV 4:2:0 format.

21. One or more tangible computer-readable media storing computer-executable instructions for causing one or more processing units, when programmed thereby, to perform operations to reconstruct frames of a higher-resolution chroma sampling format, the operations comprising:
receiving one or more frames of a lower-resolution chroma sampling format, wherein the lower-resolution chroma sampling format has a lower chroma resolution than the higher-resolution chroma sampling format; and
unpacking the one or more frames of the lower-resolution chroma sampling format into one or more frames of the higher-resolution chroma sampling format, the one or more frames of the higher-resolution chroma sampling format including sample values of chroma components and sample values of luma components, wherein the unpacking includes assigning sample values of a luma component of one of the one or more frames of the lower-resolution chroma sampling format to some of the sample values of the chroma components of the one or more frames in the higher-resolution chroma sampling format.

22. The one or more tangible computer-readable media of claim 21 wherein the operations further comprise, before the receiving and the unpacking:

decoding the one or more frames of the lower-resolution chroma sampling format.

23. The one or more tangible computer-readable media of claim 21 wherein the luma component of one of the one or more frames of the lower-resolution chroma sampling format is a luma component of an auxiliary view among the one or more frames of the lower-resolution chroma sampling format, and wherein the unpacking includes, for the chroma components of the one or more frames of the higher-resolution chroma sampling format:
assigning the sample values corresponding to the luma component of the auxiliary view among the one or more frames of the lower-resolution chroma sampling format to sample values of every second row or column of the chroma components of the one or more frames of the higher-resolution chroma sampling format;
assigning sample values corresponding to chroma components of a main view among the one or more frames of the lower-resolution chroma sampling format to sample values at every second position of other rows or columns of the chroma components of the one or more frames of the higher-resolution chroma sampling format; and
assigning sample values corresponding to chroma components of the auxiliary view among the one or more frames of the lower-resolution chroma sampling format to sample values at other positions of the other rows or columns of the chroma components of the one or more frames of the higher-resolution chroma sampling format.

24. The one or more tangible computer-readable media of claim 21 wherein the sample values of the one or more frames of the higher-resolution chroma sampling format have a first bit depth, and wherein sample values of the one or more frames of the lower-resolution chroma sampling format have a second bit depth higher than the first bit depth.

25. A computing device comprising:
one or more processing units;
volatile memory; and
non-volatile memory and/or storage, the non-volatile memory and/or storage having stored therein computer-executable instructions for causing the computing device, when programmed thereby, to perform operations comprising:
receiving one or more frames of a higher-resolution chroma sampling format, the one or more frames of the higher-resolution chroma sampling format including sample values of chroma components and sample values of luma components; and
packing the one or more frames of the higher-resolution chroma sampling format into one or more frames of a lower-resolution chroma sampling format, wherein the lower-resolution chroma sampling format has a lower chroma resolution than the higher-resolution chroma sampling format, and wherein the packing includes assigning some of the sample values of the chroma components of the one or more frames in the higher-resolution chroma sampling format to sample values of a luma component of one of the one or more frames of the lower-resolution chroma sampling format.

26. The computing device of claim 25 wherein the packing maintains geometric correspondence between adjacent sample values of the chroma components of the one or more frames of the higher-resolution chroma sampling format as adjacent samples and/or collocated portions of luma and chroma components of the one or more frames of the lower-resolution chroma sampling format.

27. The computing device of claim 26 wherein the operations further comprise, after the packing, encoding the one or more frames of the lower-resolution chroma sampling format, wherein the encoding exploits the geometric correspondence.

28. The computing device of claim 25 wherein the operations further comprise:
signaling metadata that indicates that first parts of the one or more frames of the lower-resolution chroma sampling format represent a lower chroma resolution version of the one or more frames of the higher-resolution chroma sampling format, and indicates that second parts of the one or more frames of the lower-resolution chroma sampling format, the second parts including the luma component of one of the one or more frames of the lower-resolution chroma sampling format, represent remaining chroma information from the one or more frames of the higher-resolution chroma sampling format.

29. The computing device of claim 25 wherein the luma component of one of the one or more frames of the lower-resolution chroma sampling format is a luma component of an auxiliary view among the one or more frames of the lower-resolution chroma sampling format, and wherein the packing includes, for the chroma components of the one or more frames of the higher-resolution chroma sampling format:
assigning sample values corresponding to every second row or column of the chroma components of the one or more frames of the higher-resolution chroma sampling format to sample values of the luma component of the auxiliary view among the one or more frames of the lower-resolution chroma sampling format;
assigning every second sample value corresponding to other rows or columns of the chroma components of the one or more frames of the higher-resolution chroma sampling format to sample values of chroma components of a main view among the one or more frames of the lower-resolution chroma sampling format; and
assigning other sample values corresponding to the other rows or columns of the chroma components of the one or more frames of the higher-resolution chroma sampling format to sample values of chroma components of the auxiliary view among the one or more frames of the lower-resolution chroma sampling format.

* * * * *